(12) United States Patent
Tamura

(10) Patent No.: US 6,301,530 B1
(45) Date of Patent: Oct. 9, 2001

(54) AUTOMATIC FOLLOWING TRAVEL SYSTEM

(75) Inventor: Kazuya Tamura, Wako (JP)

(73) Assignee: Honda Giken Kobgyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/599,449

(22) Filed: Jun. 22, 2000

(30) Foreign Application Priority Data

Jun. 23, 1999 (JP) .................................................. 11-177530
Jun. 23, 1999 (JP) .................................................. 11-177531

(51) Int. Cl.$^7$ ...................................................... G05D 1/00
(52) U.S. Cl. .............................. 701/23; 701/96; 701/116; 340/903; 340/435; 340/436; 180/168
(58) Field of Search ................................. 701/23, 93, 96, 701/117, 119, 116, 301; 180/168; 340/435, 436, 988, 902, 904, 907, 903

(56) References Cited

U.S. PATENT DOCUMENTS 6,032,097 * 2/2000 Iihoshi et al. ........................... 701/96
6,119,067 * 9/2000 Kikuchi ................................. 701/300
6,192,309 * 2/2001 Prestl et al. ............................. 701/93

FOREIGN PATENT DOCUMENTS 5-170008 7/1993 (JP) .

\* cited by examiner

*Primary Examiner*—William A. Cuchlinski, Jr.
*Assistant Examiner*—Gertrude Arthur
(74) *Attorney, Agent, or Firm*—Arent, Fox, Kintner, Plotkin & Kahn, PLLC

(57) ABSTRACT

The automatic following travel system of the present invention allows processional travel with a leading vehicle and a plurality of succeeding vehicles automatically following the leading vehicle, wherein Each of the vehicles comprises: a vehicle-to-vehicle communicator for communicating with the other vehicles; and a self position detector for detecting the position of the vehicle in which it is mounted, in the self coordinate system which is stored in the vehicle. Each of the succeeding vehicles comprises: a preceding vehicle position detector for detecting the position of a preceding vehicle in front of the succeeding vehicle in the procession in the succeeding vehicle coordinate system; a succeeding vehicle position transformer for transforming the succeeding vehicle position information from the succeeding vehicle coordinate system to the leading vehicle coordinate system, based on preceding vehicle position information in the succeeding vehicle coordinate system detected by the preceding vehicle position detector, on the succeeding vehicle position information in the succeeding vehicle coordinate system detected by the self position detector, and on information representing the relationship between the preceding vehicle coordinate system and the leading vehicle coordinate system transmitted from the preceding vehicle by the vehicle-to-vehicle communicator; a vehicle controller for driving the succeeding vehicle to follow the leading vehicle, based on the transformation by the succeeding-vehicle-position-to-leading-vehicle-position-coordinate-system transformer and on the position of the leading vehicle.

11 Claims, 13 Drawing Sheets

AUTOMATIC FOLLOWING TRAVEL SYSTEM

BACKGROUND OF THE INVENTION

1. Field of the Invention

The present invention relates to an automatic following travel system wherein, among a plurality of queued vehicles, a leading vehicle positioned at the front is operated by an operator, and the following vehicles positioned behind the leading vehicle automatically follow the leading vehicle so as to travel in a procession.

This application is based on Japanese Patent Application Nos. 11-177530, and 11-177531, the contents of which are incorporated herein by reference.

2. Description of the Related Art

As is commonly known, systems have been proposed wherein small electric vehicles are used in common by a plurality of users in a defined region, and thereby, efficient use of the vehicles is achieved, and by means of this, problems such as congestion and insufficient space are relieved, and a saving in resources and energy, as well as a reduction of environmental contamination, are achieved.

In other words, dedicated parking area, related ports, are established at a number of places within a limited region, and users are able to freely borrow vehicles from these ports, and furthermore, after the use of the vehicles, the vehicles may be returned to the ports. By means of this, users are able to employ the vehicles only when they are required. Furthermore, if there are a large number of ports, it is not necessary to search for parking spaces or to park along the side of the road, and it is thus possible to alleviate congestion.

However, in such a system, as a result of the locations of the ports or the like, there are concerns that vehicles may become concentrated at some ports, while at other ports, vehicles will become insufficiently available.

Techniques have been proposed for moving a plurality of vehicles efficiently between ports so as to easily remedy this imbalance of vehicles between ports (for example, in Japanese Unexamined Patent Application, First Publication, No. Hei 5-170008). In this technique, among a plurality of queued vehicles, only the leading vehicle, which is positioned at the front, is manually operated by an operator, and the operation of the succeeding vehicles is automatically controlled based on data relating to the driving operations of the leading vehicle which is transmitted from the leading vehicle. By means of this, driving is controlled so that the succeeding vehicles trace the same track as the leading vehicle, and as a result, a state is realized in which a series of vehicles travel in such a manner as to form a procession with the leading vehicle in the front (processional travel). At this time, because the operation of the succeeding vehicles is automatically controlled, unmanned operation is possible, and it is possible to reduce the number of humans involved.

When traveling in a procession, each succeeding vehicle may control its accelerator, brake, and steering so as to simply trace the track of the leading vehicle. However, even when the leading vehicle and the succeeding vehicles are the same vehicle type, the coordinates for specifying the track, which are stored in the respective vehicles, may gradually come to differ from each other, depending on the road conditions, the difference in traveled distance, and an error which may arise in the control of the travel by the sensors. However accurate the control for tracing the track of the leading vehicle is made, there is the problem that the real travel tracks may be different between the leading vehicle and the succeeding vehicles because of differences in coordinates.

To solve this problem, techniques have been proposed for controlling all the vehicles to travel according to the same coordinate system. This technique comprises: calculating the difference in the coordinates, based on the track information of the leading vehicle, which is obtained by communication between the vehicles (hereinafter referred to as vehicle-to-vehicle communication), and on the radar information obtained by an object vehicle; and transforming the track (position) information of the object vehicle to the track information in the coordinate system set in the leading vehicle.

Next is a description of the technique for transforming the track information of the succeeding vehicle to the track information in the coordinate system set in the leading vehicle.

The leading vehicle and the succeeding vehicles are electric vehicles 1 shown in FIG. 8. Electric energy from a battery 2 is supplied to a motor 4 controlled by a power train ECU 3, and the motor 4 rotates wheels 5 to drive the vehicle.

As shown in FIG. 8, the electric vehicle 1 is fitted with a laser radar 6 in the center of the front bumper capable of wide angle scanning, and a reflector 7 in the center of the rear bumper, which is a plate with a mirror finish for reflecting the radar waves emitted by a laser radar 6 of a succeeding vehicle.

When the electric vehicle 1 travels, the succeeding vehicle can pick up the location of the reflector 7 of the preceding vehicle in real time using the laser radar 6 of the succeeding vehicle, and can therefore detect the location of the preceding vehicle (the distance from the preceding vehicle) and its direction in real time.

The electric vehicle 1 has a speed sensor and a yaw rate sensor, which are not shown, and recognizes its traveling direction and track in the coordinate system set in the electric vehicle.

A vehicle to vehicle antenna 8 for radio communication between the electric vehicles 1 (vehicle to vehicle communication) is installed in the roof of the electric vehicle 1. The respective vehicles can recognize the positions and tracks of the other vehicles by vehicle-to-vehicle communication using the vehicle-to-vehicle antenna 8 (the positions and tracks of the other vehicles in the coordinate systems stored in the respective vehicles). The coordinate systems in the respective vehicles are initialized so that the origins are set to a specified port for the electric vehicles 1.

In FIG. 9, two electric vehicles 1 travel as the leading vehicle 1' and the succeeding vehicle 1". In FIG. 9, fB is the distance from the center of gravity G2 of the succeeding vehicle 1" to the laser radar 6 which is the laser measurement point, bF is the distance from the center of gravity G1 of the leading vehicle 1' to the reflector 7, Lx(t1) is the component in the traveling direction of the succeeding vehicle 1" between the laser radar 6 of the succeeding vehicle 1" and the reflector 7 of the leading vehicle 1' at a time t1, and Ly(t1) is the component in the direction perpendicular to the traveling direction of the succeeding vehicle 1" between the laser radar 6 of the succeeding vehicle 1" and the reflector 7 of the leading vehicle 1' at the time t1.

Further, reference characters are defined as follows:

GF is the coordinate system of the leading vehicle,

GB is the coordinate system of the succeeding vehicle,

XF(t1) is the X-coordinate of the center of gravity of the leading vehicle 1' in the GF coordinate system at the time t1, YF(t1) is the Y-coordinate of the center of gravity of the leading vehicle 1' in the GF coordinate system at the time t1, θF(t1) is the yaw angle of the leading vehicle 1' in the GF coordinate system at the time t1, XB(t1) is the X-coordinate of the center of gravity of the succeeding vehicle 1" in the GB coordinate system at the time t1, YB(t1) is the Y-coordinate of the center of gravity of the succeeding vehicle 1" in the GB coordinate system at the time t1, and θB(t1) is the yaw angle of the succeeding vehicle 1" in the GB coordinate system at the time t1.

The coordinates {X'F(t1), Y'F(t1)} of the radar measurement point (reflector 7) of the leading vehicle 1' in the GF coordinate system at the time t1 are given by:

$$X'F(t1)=XF(t1)-bF\times\cos\theta F(t1),$$

$$Y'F(t1)=YF(t1)-bF\times\cos\theta F(t1).$$

Similarly, the coordinates {X'FB(t1), Y'FB(t1)} of the laser measurement point (reflector 7) of the leading vehicle 1' in the GB coordinate system at the time t1 are given by:

$$X'FB(t1)=XB(t1)+\{Lx(t1)+fB\}\times\cos\theta B(t1)-Ly(t1)\times\sin\theta B(t1),$$

$$Y'FB(t1)=YB(t1)+\{Lx(t1)+fB\}\times\sin\theta B(t1)+Ly(t1)\times\cos\theta B(t1).$$

Further, the coordinates {X'F(t2), Y'F(t2)} in the GF coordinate system and {X'FB(t2), Y'FB(t2)} in the GB coordinate system of the radar measurement point (reflector 7) of the leading vehicle 1' at the time 2 after a predetermined time has passed from the time t1 (see FIG. 10) are given by:

$$X'F(t2)=XF(t2)-bF\times\cos\theta F(t2),$$

$$Y'F(t2)=YF(t2)-bF\times\cos\theta F(t2),$$

$$X'FB(t2)+XB(t2)+\{Lx(t2)+fB\}\times\cos\theta B(t2)-Ly(t2)\times\sin\theta B(t2),$$

$$Y'FB(t2)=YF(t2)+\{Lx(t2)+fB\}\times\sin\theta B(t2)+Ly(t2)\times\cos\theta B(t2)$$

As shown in FIG. 10, when the position A of the radar measurement point (reflector 7) of the leading vehicle 1' at the time t1 is connected to the position B at the time t2 by the straight line L, the coordinates of the position A in the GF coordinate system are {X'F(t1), Y'F(t1)}, and the coordinates of the position B in the GF coordinate system are {X'F(t2), Y'F(t2)}. Accordingly, the angle θ'F(t1, t2) between the straight line L and the XF-axis is given by:

$$\theta'F(t1, t2)=\arctan\left[\{X'F(t2)-X'F(t1)\}/\{Y'F(t2)-Y'F(t1)\}\right].$$

Similarly, when the straight line L is placed in the GB coordinate system, the coordinates of the position A (see FIG. 10) are {X'FB(t1), Y'FB(t1)}, and the coordinates of the position B are {X'FB(t2), Y'FB(t2)}. Accordingly, the angle θ'FB(t1, t2) between the straight line L and the XB-axis is given by:

$$\theta'FB(t1, t2)=\arctan\left[\{X'FB(t2)-X'FB(t1)\}/\{Y'FB(t2)-Y'FB(t1)\}\right].$$

Since in two coordinate systems the straight line L is identical, the rotation angle ΔθFB of the GF coordinate system with respect to the GB coordinate system is given by:

$$\Delta\theta FB=\theta'FB(t1, t2)-\theta'F(t1, t2).$$

Further, when the position X-coordinate of the origin of the GF coordinate system with respect to the GB coordinate system is ΔXFB, and the position Y coordinate of the origin of the GF coordinate system with respect to the GB coordinate system is ΔYFB, the ΔXFB and the ΔYFB are given by:

$$\Delta XFB=X'FB(t2)-X'F(t2)\times\cos\Delta\theta FB-Y'F(t2)\times\sin\Delta\theta FB,$$

$$\Delta YFB=Y'FB(t2)-X'F(t2)\times\sin\Delta\theta FB-Y'F(t2)\times\cos\Delta\theta FB$$

As described above, the difference (deviation) {ΔXFB, ΔYFB, ΔθFB} between the coordinate systems of the leading vehicle 1' and of the succeeding vehicle 1" can be expressed by the position coordinates (XF, YF, θF) of the leading vehicle 1' in the coordinate system set in the leading vehicle 1', the position coordinates (XB, YB, θB) of the succeeding vehicle 1" in the coordinate system set in the succeeding vehicle 1", and the laser information Lx and Ly. Thus, the succeeding vehicle 1" calculates the difference between the coordinate systems of the leading vehicle 1' and the succeeding vehicle 1" from the position and the traveling direction of the succeeding vehicle in the coordinate system set in the succeeding vehicle, the position of the leading vehicle 1' in the coordinate system set in the leading vehicle 1', and the distance and direction of the leading vehicle 1' detected by the laser radar 6. By adding the difference to the track information of the succeeding vehicle 1", the track information of the succeeding vehicle 1" can be transformed to the track information in the coordinate system set in the leading vehicle 1'.

In the above-described example, the leading vehicle 1' is single, and the succeeding vehicle 1" is single. Even when there are two or more succeeding vehicles 1" each vehicle can calculate the difference between the coordinate system set in the vehicle just in front and the coordinate system set in the vehicle itself. By calculating the differences between the coordinate systems from the leading vehicle 1' in due order, the differences between the coordinate systems of the leading vehicle 1' and the respective succeeding vehicles 1" can be calculated. Using the calculated differences, the respective succeeding vehicles 1" can transform their track (position) information to the track information in the coordinate system set in the leading vehicle 1'.

According to the above-described technique, the difference between the coordinate systems can be directly calculated only between the vehicle and the vehicle just in front of that vehicle. Therefore, when there are a certain number "n" of vehicles in front of the succeeding vehicle 1", the number of the differences which can be directly calculated is "n".

FIG. 11 schematically shows the processional travel of four electric vehicles 1. In this example, the differences between the coordinate systems which can be directly calculated by the above-described technique are three, which are:

1) the difference $(\Delta x, \Delta y, \Delta\theta)_{2\rightarrow1}$ between the coordinate systems of the leading vehicle 1' (hereinafter referred to as the first vehicle) and of the succeeding vehicle 1" (hereinafter referred to as the second vehicle) just behind the leading vehicle, 2) the difference $(\Delta x, \Delta y, \Delta\theta)_{3\rightarrow2}$ between the coordinate systems of the second vehicle and of the succeeding vehicle (hereinafter referred to as the third vehicle) just behind the second vehicle, 3) the difference $(\Delta x, \Delta y, \Delta\theta)_{4\rightarrow3}$ between the coordinate systems of the third vehicle and of the succeeding vehicle (hereinafter referred to as the fourth vehicle) just behind the third vehicle, where $(\Delta x, \Delta y, \Delta\theta)_{m \to n}$ is a difference (x-direction, y-direction, rotation) between the coordinate systems of the M-vehicle and the N-vehicle.

To obtain the difference $(\Delta x, \Delta y, \Delta\theta)_{4 \to 1}$ between the coordinate systems of the fourth vehicle and of the first vehicle, the differences 1) to 3) are added up.

To accurately calculate $(\Delta x, \theta y, \Delta\theta)_{4 \to 1}$, the values 1) to 3) must be calculated based on the data obtained at the same time. That is, as the differences between the coordinate systems in the respective vehicles vary every moment, in order to accurately specify the difference between the coordinate systems of the fourth vehicle and of the first vehicle at the time t, the values 1) to 3) to be included in the difference must be synchronized at the time t. That is, the difference must be based on the data obtained at the same time t. This is also true in the calculation of the difference $(\Delta x, \Delta y, \Delta\theta)_{3 \to 1}$ between the coordinate systems of the third vehicle and of the first vehicle, and in the calculation of the difference $(\Delta x, \Delta y, \Delta\theta)_{n \to 1}$ between the coordinate systems of the first vehicle and of a n-th vehicle which is positioned behind the fourth vehicle.

To avoid the problem of the asynchrony in the data, when calculating the difference between the coordinate systems of the first vehicle and of the "n"-th vehicle according to the conventional technique, the "n"-th vehicle receives the differences, which the second, third, . . . "n-1"-th vehicles used to transform the difference between the coordinate systems, from the vehicle just in front by vehicle-to-vehicle communication, and adds these differences to the difference between the coordinate systems of the "n-1"-th vehicle and of the "n"-th vehicle. Thus, the required difference (between the coordinate systems of the first vehicle and of the "n"-th vehicle) can calculated.

Specifically, when four vehicles travel in a procession as shown in FIG. 11, the respective vehicles calculate the desired differences. In the following formulas, $(xn, yn, \theta n)_m$ is the position and traveling direction of the "n"-th vehicle expressed in the coordinate system set in the "m"-th vehicle.

To obtain the value $(x2, y2, \theta 2)_1$ of the position coordinates of the second vehicle converted into the coordinate system of the first vehicle, the second vehicle calculate:

$$(x2, y2, \theta 2)_1 = (x2, y2, \theta 2)_2 + (\Delta x, \Delta y, \Delta\theta)_{2 \to 1}.$$

By this calculation, the second vehicle can convert its coordinates into the value in the coordinate system set in the first vehicle, based only on the information obtained by the second vehicle itself (that is, the position and traveling direction in its own coordinate system, and the difference between the coordinate systems of the second vehicle and of the vehicle in front).

However, to obtain the value $(x3, y3, \theta 3)_1$ of the position coordinates of the third vehicle converted into the coordinate system of the first vehicle, the third vehicle must calculates:

$$(x3, y3, \theta 3)_1 = (x3, y3, \theta 3)_3 + (\Delta x, \Delta y, \Delta\theta)_{3 \to 1}.$$

Because in this calculation the value $(\Delta x, \Delta y, \Delta\theta)_{3 \to 1}$ cannot be directly calculated based on the laser information, the third vehicle adds its position and traveling direction $(x3, y3, \theta 3)_3$ in its own coordinate system to the difference $(\Delta x, \Delta y, \Delta\theta)_{3 \to 2}$ between the coordinate systems of the second vehicle and of the third vehicle, which was calculated by the third vehicle, to thereby obtain the position and traveling direction $(x3, y3, \theta 3)_2$ of the third vehicle in the coordinate system set in the second vehicle. Then, the third vehicle adds this obtained value to the difference between the coordinate systems of the second vehicle and of the first vehicle, to thereby obtain $(x3, y3, \theta 3)_1$.

That is, $$(x3, y3, \theta 3)_2 = (x3, y3, \theta 3)_3 + (\Delta x, \Delta y, \Delta\theta)_{3 \to 2}.$$

Accordingly, $$(x3, y3, \theta 3)_1 = (x3, y3, \theta 3)_2 + (\Delta x, \Delta y, \Delta\theta)_{2 \to 1} = (x3, y3, \theta 3)_3 + (\Delta x, \Delta y, \Delta\theta)_{3 \to 2} + (\Delta x, \Delta y, \Delta\theta)_{2 \to 1}.$$

Similarly, the value $(x4, y4, \theta 4)_1$ of the position coordinates and traveling direction of the fourth vehicle converted into the coordinate system of the first vehicle is calculated by:

$$(x4, y4, \theta 4)_1 = (x4, y4, \theta 4)_2 + (\Delta x, \Delta y, \Delta\theta)_{2 \to 1}$$

$$= (x4, y4, \theta 4)_3 + (\Delta x, \Delta y, \Delta\theta)_{3 \to 2} + (\Delta x, \Delta y, \Delta\theta)_{2 \to 1}$$

$$= (x4, y4, \theta 4)_4 + (\Delta x, \Delta y, \Delta\theta)_{4 \to 3} + (\Delta x, \Delta y, \Delta\theta)_{3 \to 2} + (\Delta x, \Delta y, \Delta\theta)_{2 \to 1}.$$

It is understood that, as the vehicle is nearing the end of the procession, the terms required for the formula for converting the position of the succeeding vehicle 1" in the coordinate system in the succeeding vehicle 1" into the value in the coordinate system of the leading vehicle 1' increase. Therefore, the load due to the calculation by the vehicles behind significantly increases.

Further, to avoid the problem of the asynchrony in data, the information regarding the differences between the coordinate systems used in the transformation should be identical to those used by the vehicles in front which have transformed their positions. When all the information is supplied from the vehicles in front by vehicle-to-vehicle communication, the information to be transmitted from the second vehicle to the third vehicle includes only $(\Delta x, \Delta y, \Delta\theta)_{2 \to 1}$, and the information to be transmitted from the second vehicle to the third vehicle must include two data points $(\Delta x, \Delta y, \Delta\theta)_{2 \to 1}$ and $(\Delta x, \Delta y, \Delta\theta)_{3 \to 2}$. Further, n-1 points data must be transmitted to the "n"-th vehicle behind these vehicles. Therefore, when a number of vehicles travels in a procession, the communication buffer capacities required for the vehicle-to-vehicle communication must be increased, the loads on the CPUs in the respective vehicles are also increased, and thereby quick control may be impossible.

BRIEF SUMMARY OF THE INVENTION

It is therefore an object of the present invention to provide a system which can reduce the calculation loads in the respective vehicles, can decrease the communication buffer capacities, can reduce the load on the CPUs, and enables quick control.

In order to accomplish the above object, in the automatic following travel system of the present invention that allows processional travel with a leading vehicle (1') and a plurality of succeeding vehicles (1") automatically following the leading vehicle, each of the vehicles (electric vehicles 1) comprises: a vehicle-to-vehicle communicator (31) for communicating with the other vehicles; and a self position detector (the process in block B2 or B102 by the automatic driving ECU 17) for detecting the position of the vehicle in which it is mounted, in the self coordinate system which is stored in the vehicle. Each of the succeeding vehicles comprises: a preceding vehicle position detector (the process in block B3 or B103 by the automatic driving ECU 17) for detecting the position of a preceding vehicle in front of the succeeding vehicle in the procession in the succeeding vehicle coordinate system; a succeeding vehicle position transformer (the processes in blocks B4, B5, and B6, or B104, and B105, by the automatic driving ECU 17) for transforming the succeeding vehicle position information from the succeeding vehicle coordinate system to the leading vehicle coordinate system, based on preceding vehicle position information in the succeeding vehicle coordinate system detected by the preceding vehicle position detector, on the succeeding vehicle position information in the succeeding vehicle coordinate system detected by the self position detector, and on information representing the relationship between the preceding vehicle coordinate system and the leading vehicle coordinate system transmitted from the preceding vehicle by the vehicle-to-vehicle communicator; and a vehicle controller (the processes in blocks B71, B72, B81, B82, and B83, or B106, and B107, and the steering ECU 16, the power train ECU 3, and the brake ECU 15 in the first embodiment) for driving the succeeding vehicle to follow the leading vehicle, based on the transformation by the succeeding-vehicle-position-to-leading-vehicle-position-coordinate-system transformer and on the position of the leading vehicle.

In another aspect of the invention, the succeeding vehicle position transformer comprises: a succeeding-vehicle-position-to-preceding-vehicle-coordinate-system transformer (the processes in blocks B4, and B5 by the automatic driving ECU 17 in the first embodiment) for transforming the succeeding vehicle position information from the succeeding vehicle coordinate system to the preceding vehicle coordinate system, based on the preceding vehicle position information in the succeeding vehicle coordinate system detected by the preceding vehicle position detector, on the succeeding vehicle position information in the succeeding vehicle coordinate system detected by the self position detector, and on the preceding vehicle position information in the preceding coordinate system transmitted by the vehicle-to-vehicle communicator; and a succeeding-vehicle-position-to-leading-vehicle-coordinate-system transformer (the process in block B6 by the automatic driving ECU 17 in the first embodiment) for transforming the succeeding vehicle position information, which was transformed to the preceding vehicle coordinate system, to the leading vehicle coordinate system, based on the transformation in the preceding vehicle to the leading vehicle coordinate system transmitted by the vehicle-to-vehicle communicator, when the preceding vehicle is not the leading vehicle.

When the leading vehicle is referred to as the first vehicle, the succeeding vehicle is referred to as the "n"-th vehicle (positioned at the "n"-th position from the head of the procession), and the preceding vehicle is referred to as an "n−1"-th vehicle, the "n"-th vehicle obtains the following information:

1) the "n"-th vehicle position information in the "n"-th vehicle coordinate system: $(X_n, y_n, \theta_n)_n$, and,
2) the "n−1"-th vehicle position information in the "n"-th vehicle coordinate system: $(x_{n-1}, y_{n-1}, \theta_{n-1}t)_n$, which are detected by the "n"-th vehicle, and
3) the "n−1"-th vehicle position information in the "n"-th vehicle coordinate system: $(X_{n-1}, y_{n-1}, \theta_{n-1})_{n-1}$,
4) the transformation by the "n−1"-th vehicle to the first vehicle coordinate system: $(\Delta x, \Delta y, \Delta \theta)_{n-1 \to 1}$, and
5) the first vehicle position information in the first vehicle coordinate system: $(x_1, y_1, \theta_1)_1$.

In the "n"-th vehicle, based on the information 1), 2), and 3), the succeeding-vehicle-position-to-preceding-vehicle-coordinate-system transformer calculates the "n"-th vehicle position information $(x_n, y_n, \theta_n)_{n-1}$. Based on these calculation results and the information 4), the succeeding-vehicle-position-to-leading-vehicle-coordinate-system transformer calculates the "n"-th vehicle position information $(x_n, y_n, \theta_n)_1$ in the first vehicle coordinate system. Based on these calculation results and the information 5), the "n"-th vehicle obtains the amount of operations required to allow the "n"-th vehicle to follow the first vehicle.

All the processes that the "n"-th vehicle performs are the calculation by the succeeding-vehicle-position-to-preceding-vehicle-coordinate-system transformer which is:

$$(x_n, y_n, \theta_n)_{n-1} = (x_n, y_n, \theta_n)_n + \{(x_{n-1}, y_{n-1}, \theta_{n-1})_{n-1} - (x_{n-1}, y_{n-1}, \theta_{n-1})_n\}, \quad (1)$$

and the calculation by the succeeding-vehicle-position-to-leading-vehicle-coordinate-system transformer which is:

$$(x_n, y_n, \theta_n)_1 = (x_n, y_n, \theta_n)_{n-1} + (\Delta x, \Delta y, \Delta \theta)_{n-1 \to 1}. \quad (2)$$

Thus, the calculation load can be reduced as compared with the background technique.

The "n"-th vehicle obtains the transformation $(\Delta x, \Delta y, \Delta \theta)_{n-1 \to 1}$ by the "n−1"-th vehicle to the first vehicle coordinate system by vehicle-to-vehicle communication from the "n−1"-th vehicle. Therefore, because it is not necessary to receive the differences between pairs of sequential vehicles $(\Delta x, \Delta y, \Delta \theta)_{2 \to 1}$, $(\Delta x, \Delta y, \Delta \theta)_{3 \to 2}$, $(\Delta x, \Delta y, \Delta \theta)_{4 \to 3}, \ldots (\Delta x, \Delta y, \Delta \theta)_{n-1 \to n-2}$ from the preceding vehicle, the buffer required can be reduced. Further, because it is not necessary to add up all the differences between pairs of vehicles, the load on the CPUs for the calculation processes can be reduced, and quick control is possible.

In another aspect of the invention, the succeeding vehicle position transformer comprises: a difference calculator (steps S45, and S48) for calculating differences in the traveling direction and in the $x^-$ and $y^-$ directions between the succeeding vehicle coordinate system and the preceding vehicle coordinate system; and a first transformer (steps S51 to S53) for transforming the succeeding vehicle position information from the succeeding coordinate system to the preceding vehicle coordinate system, based on the differences between the succeeding vehicle coordinate system and the preceding vehicle coordinate system calculated by the difference calculator of the succeeding vehicle; and a second transformer (steps S61 to S63) for transforming the succeeding vehicle position information from the preceding vehicle coordinate system to the leading vehicle coordinate system, based on the differences between the preceding vehicle coordinate system and the leading vehicle coordinate system which are calculated by the difference calculator of the preceding vehicle and are transmitted to the succeeding vehicle by the vehicle-to-vehicle communicator.

In another aspect of the invention, the succeeding vehicle position transformer comprises: a succeeding-vehicle-position-to-leading-vehicle-coordinate-system transformer (the processes in blocks B104, and B105 by the automatic driving ECU 17 in the second embodiment) for transforming the succeeding vehicle position information from the succeeding vehicle coordinate system to the leading vehicle coordinate system, based on preceding vehicle position information, which was transformed to the leading vehicle coordinate system by the preceding vehicle and was transmitted by the vehicle-to-vehicle communicator, on preceding vehicle position information in the succeeding vehicle coordinate system detected by the preceding vehicle position detector, and on the succeeding vehicle position information in the succeeding vehicle coordinate system detected by the self position detector.

When the leading vehicle is referred to as a first vehicle, the succeeding vehicle is referred to as an "n"-th vehicle (positioned at the "n"-th position from the head of the procession), and the preceding vehicle is referred to as an "n−1"-th vehicle, the "n"-th vehicle obtains the following information:

1) the "n"-th vehicle position information in the "n"-th vehicle coordinate system: $(x_n, y_n, \theta_n)_n$, and,
2) the "n−1"-th vehicle position information in the "n"-th vehicle coordinate system: $(x_{n-1}, y_{n-1}, \theta_{n-1})_n$, which are detected by the "n"-th vehicle, and
3) the "n−1"-th vehicle position information in the first vehicle coordinate system: $(x_{n-1}, y_{n-1}, \theta_{n-1})_1$, and
4) the first vehicle position information in the first vehicle coordinate system: $(x_1, y_1, \theta_1)_1$, which are obtained by vehicle-to-vehicle communication.

In the "n"-th vehicle, based on the information 1), 2), and 3), the succeeding-vehicle-position-to-leading-vehicle-coordinate-system transformer calculates the "n"-th vehicle position information $(x_n, y_n, \theta_n)_1$ in the first vehicle coordinate system. Based on these calculation results and the information 4), the "n"-th vehicle obtains the amount of operations required to allow the "n"-th vehicle to follow the first vehicle.

The succeeding-vehicle-position-to-leading-vehicle-coordinate-system transformer directly calculates the transformation from the "n"-th coordinate system to the first coordinate system, based on the information 2) and 3). Based on these results and the information 1), the "n"-th vehicle position information can be transformed to the first vehicle coordinate system.

Because $(x_{n-1}, y_{n-1}, \theta_{n-1})_n$ and the $(x_{n-1}, y_{n-}, \theta_{n-1})_1$ specify the "n−1"-th vehicle position according to the "n"-th-vehicle coordinate system and the first vehicle coordinate system, the difference $(\Delta x, \Delta y, \Delta\theta)_{n\to 1}$ between the leading vehicle coordinate system and the succeeding vehicle coordinate system can be directly computed. Therefore, when calculating the difference, it is not necessary to add all the differences between pairs of sequential vehicles $(\Delta x, \Delta y, \Delta\theta)_{2\to 1}$, $(\Delta x, \Delta y, \Delta\theta)_{3\to 2}$, $(\Delta x, \Delta y, \Delta\theta)_{4\to 3}$, . . . $(\Delta x, \Delta y, \Delta\theta)_{n-1\to n-2}$, thereby reducing the calculation load.

Further, the information to be transmitted from the "n−1"-th vehicle to the "n"-th vehicle by vehicle-to-vehicle communication is only the information 3) and 4). Therefore, it is not necessary to obtain the differences between pairs of sequential vehicles $(\Delta x, \Delta y, \Delta\theta)_{2\to 1}$, $(\Delta x, \Delta y, \Delta\theta)_{3\to 2}$, $(\Delta x, \Delta y, \Delta\theta)_{4\to 3}$, . . . $(\Delta x, \Delta y, \Delta\theta)_{n-1\to n-2}$, thereby reducing the load on the vehicle-to-vehicle communication and on the CPUs, and enabling quick control.

In another aspect of the invention, the succeeding vehicle position transformer comprises: a difference calculator (steps S145, and S148) for calculating differences in traveling direction and in the $x^-$ and $y^-$ directions between the succeeding vehicle coordinate system and the preceding vehicle coordinate system which was transformed to the leading vehicle coordinate system by the preceding vehicle; and a transformer (steps S151 to S153) for transforming the succeeding vehicle position information from the succeeding coordinate system to the leading vehicle coordinate system, based on the differences between the succeeding vehicle coordinate system and the preceding vehicle coordinate system calculated by the succeeding vehicle.

The difference calculator (step S46, or S146) employs a certain percentage of the calculation results as the differences in the traveling direction. Further, the difference calculator (step S49, or S146) employs a certain percentage of the calculation results as the differences in the $x^-$ and $y^-$ directions. Each of the vehicles sets the point of a magnetic nail, buried in the ground, as the origin of its coordinate system before starting. When starting the processional travel, as the communication by the vehicle-to-vehicle communicator is opened, timers in the respective electric vehicles are reset and synchronized.

DETAILED DESCRIPTION OF THE INVENTION

First Embodiment

Hereinafter, embodiments of the present invention are described with reference to the drawings.

Figure 1:
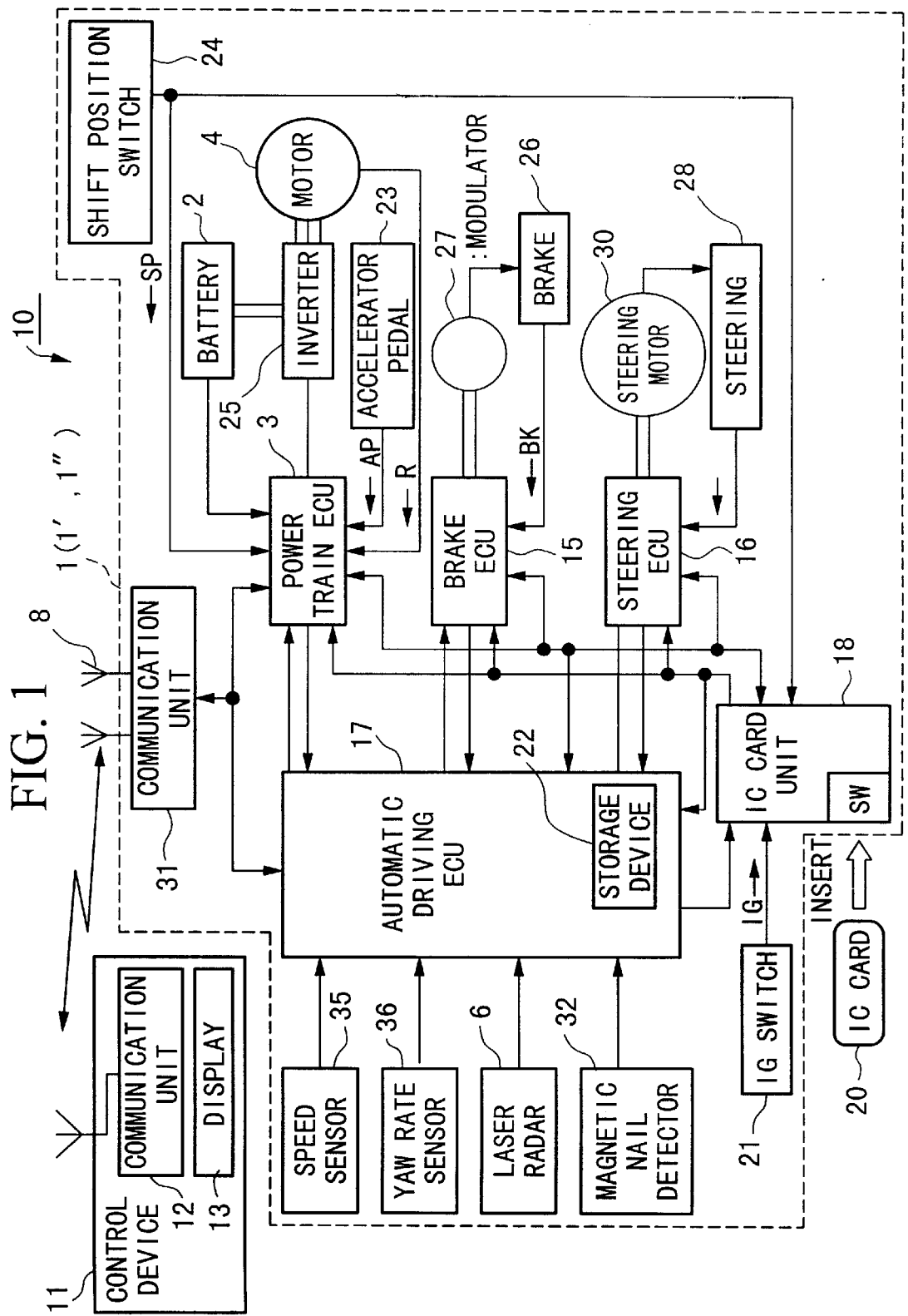
FIG. 1 is a diagram schematically showing the embodiment of the present invention.

FIG. 1 is a block diagram showing the automatic following system 10 of the embodiment of the present invention. The automatic following system 10 comprises a control device 11 and a plurality of electric vehicles 1. For reasons of convenience, the structure of only one electric vehicle 1 is illustrated.

The control device 11 comprises a CPU and a storage device, and controls and guides the electric vehicle 1, which is in a guided and controlled state, via a communication unit 12. Further, the control device 11 displays the operating condition of the electric vehicles 1 on a display device 13.

Figure 8:
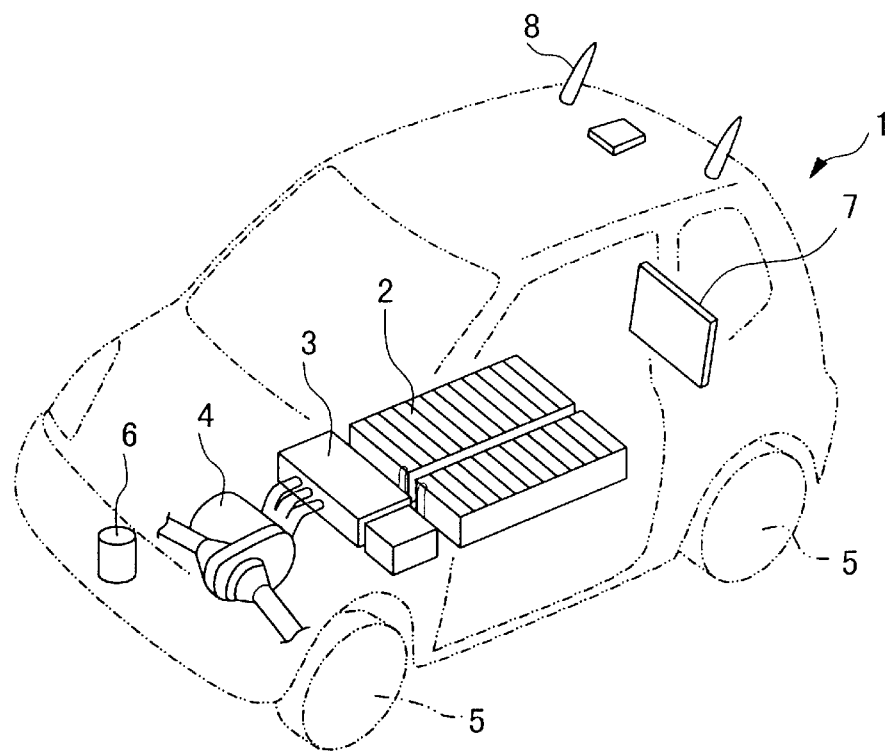
FIG. 8 is a perspective view showing the structure of an electric vehicle.
Figure 9:
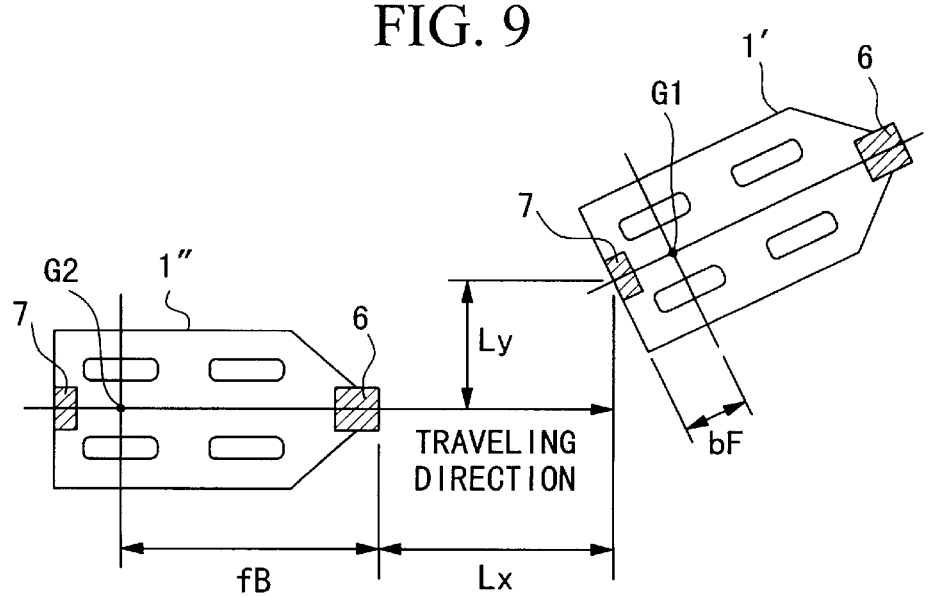
FIG. 9 is a top view showing the relationship between the laser radar of the succeeding vehicle and the radar measurement point of the preceding vehicle when the electric vehicles shown in FIG. 8 travels in a procession.
Figure 10:
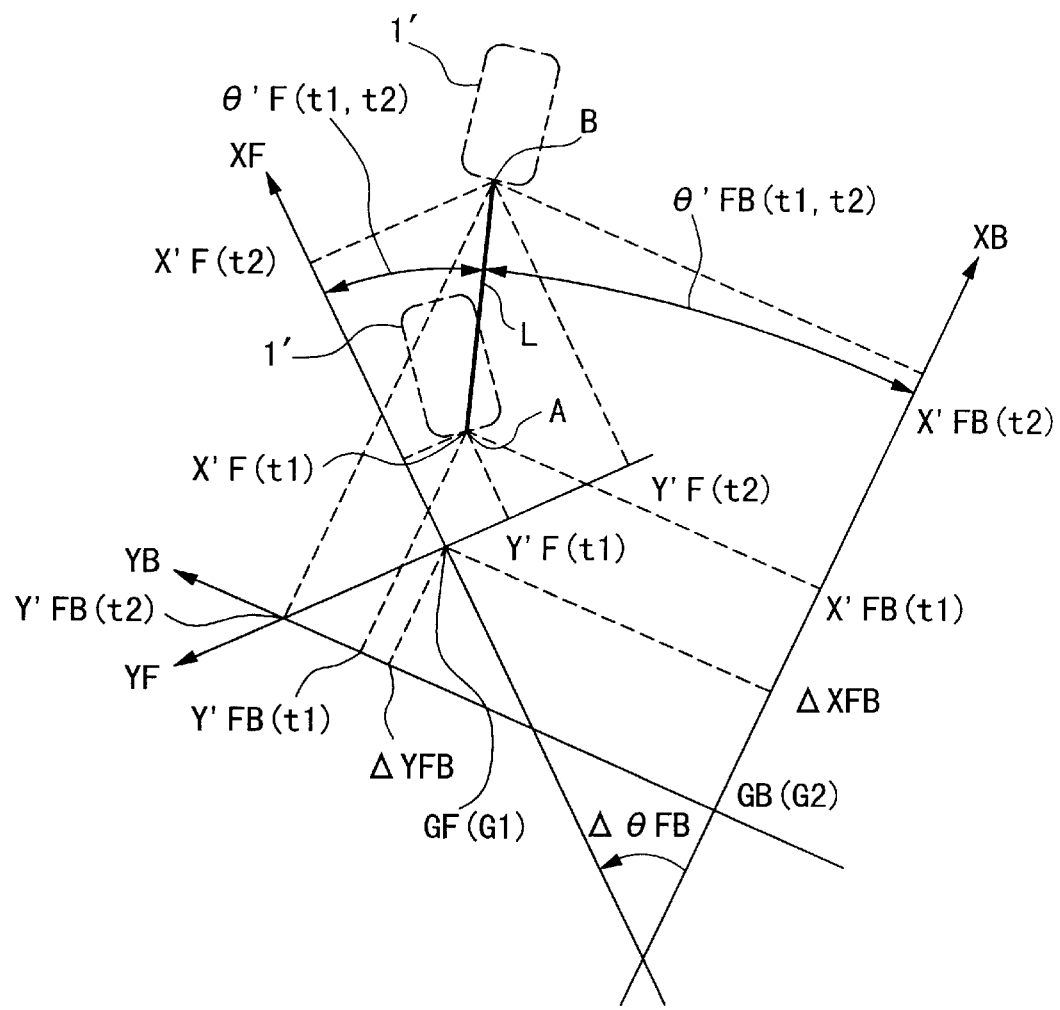
FIG. 10 is a diagram for explaining the difference between the leading vehicle coordinate system and the succeeding vehicle coordinate system.
Figure 11:
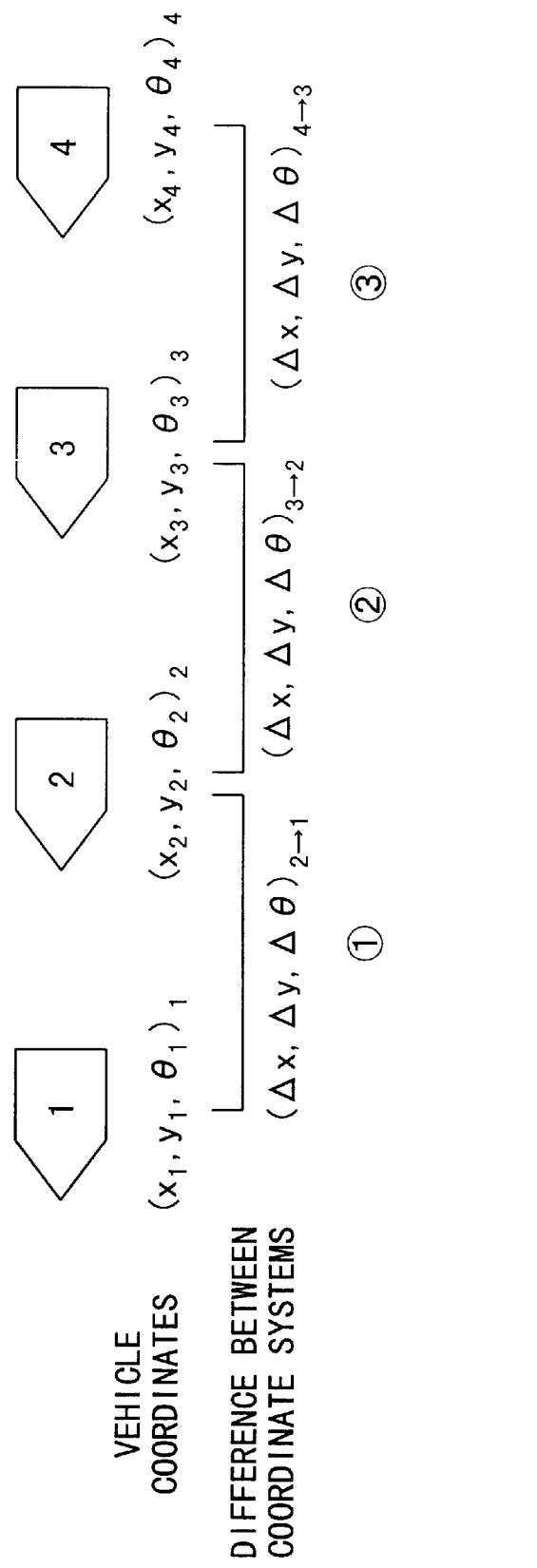
FIG. 11 is a top view showing the processional travel of four electric vehicles.

The electric vehicle 1 has the same structure as that shown in FIG. 8, and comprises a power train ECU 3, a brake ECU 15, a steering ECU 16, and an automatic driving ECU 17. The automatic driving ECU 17 is mainly used to drive the electric vehicles 1 in an unmanned state. The power train ECU 3, the brake ECU 15, and the steering ECU 16 are used in both automatic driving and manual driving.

Switching between the automatic control driving and the manual driving in the electric vehicle 1 is judged, based on whether an IC card 20 is inserted into an IC card unit 18 or not. That is, the IC card unit 18 comprises a CPU and a storage device, and determines via a switch SW whether the IC card 20 is inserted or not. The CPU of the IC card unit 18 determines whether the electric vehicle 1 should select automatic driving, or manual driving, based on a signal indicating the presence or absence of the IC card 20 from the switch SW, an IG (ignition) signal input from an IG switch 21 operated by a user, and an IG (ignition) command signal included in a command signal for instructing driving control and transmitted from the control device 11.

The IC card unit 18 outputs the determination results as to whether the electric vehicle 1 should select automatic control driving, or manual driving, to the power train ECU 3, the brake ECU 15, the steering ECU 16, and the automatic driving ECU 17. When the determination results instructing to enter automatic control driving are output, the automatic driving ECU 17 controls the power train ECU 3, the brake ECU 15, and the steering ECU 16, according to programs stored in the storage device 22.

The power train ECU 3 comprises a CPU and a storage device, drives wheels (not shown) by transmitting power produced by a motor 4, and controls the power train for driving the electric vehicle 1. The power train ECU 3 adjusts the number of pulses output from an inverter 25 to control the speed of rotation R of the motor 4, while monitoring the speed of rotation R of the motor 4 input from a rotation sensor (not shown), based on the opening state AP of an accelerator pedal input from an accelerator sensor (not shown) of an accelerator pedal 23 and on the state of a shift position switch 24.

Further, in automatic control driving mode, the power train ECU 3 adjusts the accelerator pedal opening state AP to control the speed of rotation of the motor 4, according to the degree of operation of the accelerator calculated by the automatic driving ECU 17.

In manual driving mode, the power train ECU 3 controls the speed of rotation of the motor 4, according to the accelerator pedal opening state AP corresponding to the depression of the accelerator by the user.

The shift position switch 24 outputs a control signal SP for instructing the speed and direction of rotation of the motor 4 to the power train ECU 3, corresponding to the position of a gear shift, to thereby adjust the forward speed and to drive the electric vehicle 1 in reverse.

Further, in automatic control driving, the automatic driving ECU 17 controls the position of the gear shift in the shift position switch 24 according to programs stored in the storage device 22. In manual driving mode, the user moves the gear shift in the shift position switch 24.

The inverter 25 converts a voltage output from the battery 2 which is a DC power source into a three-phase alternating current, and outputs it to the motor 4, to thereby drive the motor which is three-phase alternating current motor.

The brake ECU 15 comprises a CPU and a storage device, and controls a modulator 27 for adjusting the effects of the oil hydraulic brake of the brake 26. The brake ECU 15 calculates the degree of operation of the oil hydraulic brake, based on the oil pressure which is input from the brake 26 and is detected by an oil pressure sensor, which is not shown, of the modulator 27, and feeds this degree of operation as a signal BK back to the control of the modulator 27.

Further, in automatic control driving mode, the brake ECU 15 controls the degree of operation of the brake pedal, based on the degree of operation of the oil hydraulic brake calculated by the automatic driving ECU 17. In manual driving mode, the brake ECU 15 controls the effects of the oil hydraulic brake, based on the degree of operation of the brake pedal depressed by the user.

The steering ECU 16 comprises a CPU and a storage device, and, in guided driving mode, controls a steering motor 30 (power steering) for adjusting the traveling direction of the electric vehicle 1, that is, the angle of the steering wheel 28, based on a control signal input from the control device 1. The steering wheel 28 measures the angle input to the steering ECU 16 using an angle sensor (not shown), and outputs the measurement results as a signal ST. Further, the steering ECU 16 performs feedback to the control of the steering motor 30 according to the input signal ST.

In automatic control driving, the steering ECU 16 controls the angle of the steering with respect to the traveling direction, based on the steering angle calculated by the automatic driving ECU 17. In manual driving mode, the steering ECU 16 controls the angle of the steering when changing the traveling direction, based on the degree of operation of the steering wheel (not shown) rotated by the user.

The communication unit 31 performs the vehicle-to-vehicle communication with the other electric vehicles 1 using the vehicle-to-vehicle antenna 8, and sends and receives information between the automatic driving ECU 17 of the object vehicle, in which the communication unit 31 is mounted, and the automatic driving ECUs 17 of the other electric vehicles 1.

Further, the communication unit 31 has a GPS receiver which is not shown, which receives a GPS signal from a satellite, and transmits the received results to the automatic driving ECU 17.

A magnetic nail detector 32 comprises a magnetic sensor not shown, detects alternating currents from nails buried at stop areas for the electric vehicles 1 in a dedicated port, not shown, and outputs the detection results to the automatic driving ECU 17.

The automatic driving ECU 17 is connected to a speed sensor 35 and a yaw rate sensor 36. The CPU of the automatic driving ECU 17 samples the detection results from the speed sensor 35 and the yaw rate sensor 36 at a fixed interval (e.g., 10 ms) using watch dog timer, calculates the position information of the object vehicle (the present location and traveling direction of the object vehicle) at a fixed interval (e.g., 10 ms), based on these detection results and the vehicle position obtained from the GPS signal, and stores the calculation results as track data in the storage device 22, setting its address to time.

The automatic driving ECU 17 calculates the position (distance) and direction from the object vehicle to the vehicle in front in a real time manner, based on the detection results from the laser radar 6.

In addition, the automatic driving ECU 17 can calculate the difference in the coordinate systems of the object vehicle and the vehicle in front of that vehicle, based on the calculated present locations of the object vehicle and of the vehicle in front and on the preset location of the vehicle in front which was calculated by the vehicle in front and was obtained by vehicle-to-vehicle communication.

The above-described automatic travel system 10 starts processional travel of a plurality of electric vehicles 1 as follows. The control device 11 specifies the vehicles which are to travel in a procession (hereinafter referred to as a vehicle group), guides these electric vehicles 1 to a travel starting point in the dedicated port, and stops them in a line.

Then, the automatic driving ECUs (which function as a coordinate origin setter) of the electric vehicles 1 detect the position of the magnetic nail buried in the dedicated port using the magnetic nail detectors 32, and set the point as the origin of the coordinate systems in the respective vehicles.

Of the electric vehicles 1 aligned in a line, the control device 11 allows the vehicle at the head of the line to recognize itself as the leading vehicle 1', and allows the electric vehicles 1 behind the leading vehicle 1' to recognize themselves as the succeeding vehicles 1".

A driver then occupies on the leading vehicle 1' of the vehicles forming the line, inserts the IC card 20 into the IC card unit 18, and turns on the IG switch 21, so that the leading vehicle 1' enters the manual driving mode. The communication unit 31 of the leading vehicle 1' opens a communication line for the vehicle-to-vehicle communication with the succeeding vehicles 1".

As the communication line is opened, the timers in the respective electric vehicles 1 are reset and synchronized with the timer of the leading vehicle 1'.

The automatic driving ECUs 17 of the succeeding vehicles 1" are changed to automatic control driving mode according to the IG command signal from the control device 11, refer to the distances and directions to the vehicles in front obtained by the laser radars 6, and start the control of the power train ECUs 3, the brake ECUs 15, and the steering ECUs 16 to maintain the distances to the vehicles in front.

The leading vehicle 1' refers to fault diagnosis results performed by the power train ECU 3, the brake ECU 15, and the steering ECU 16, and determines whether the leading vehicle 1' and the succeeding vehicles 1" can start processional travel as a group or not. When the processional travel is possible, the permission to start the processional travel is displayed on a control panel, not shown, of the leading vehicle. The driver in the leading vehicle 1' can confirm the permission, and manually operates the leading vehicle 1'. The succeeding vehicles 1" start traveling after the leading vehicle 1' according to the programs stored in the storage devices 22 of the automatic driving ECUs 17, and thus the processional travel is started.

During the processional travel, the succeeding vehicles 1" perform processes, described later, at a fixed interval (e.g., 10 ms), and control the steering motors 30 via the steering ECUs 16.

Figure 2:
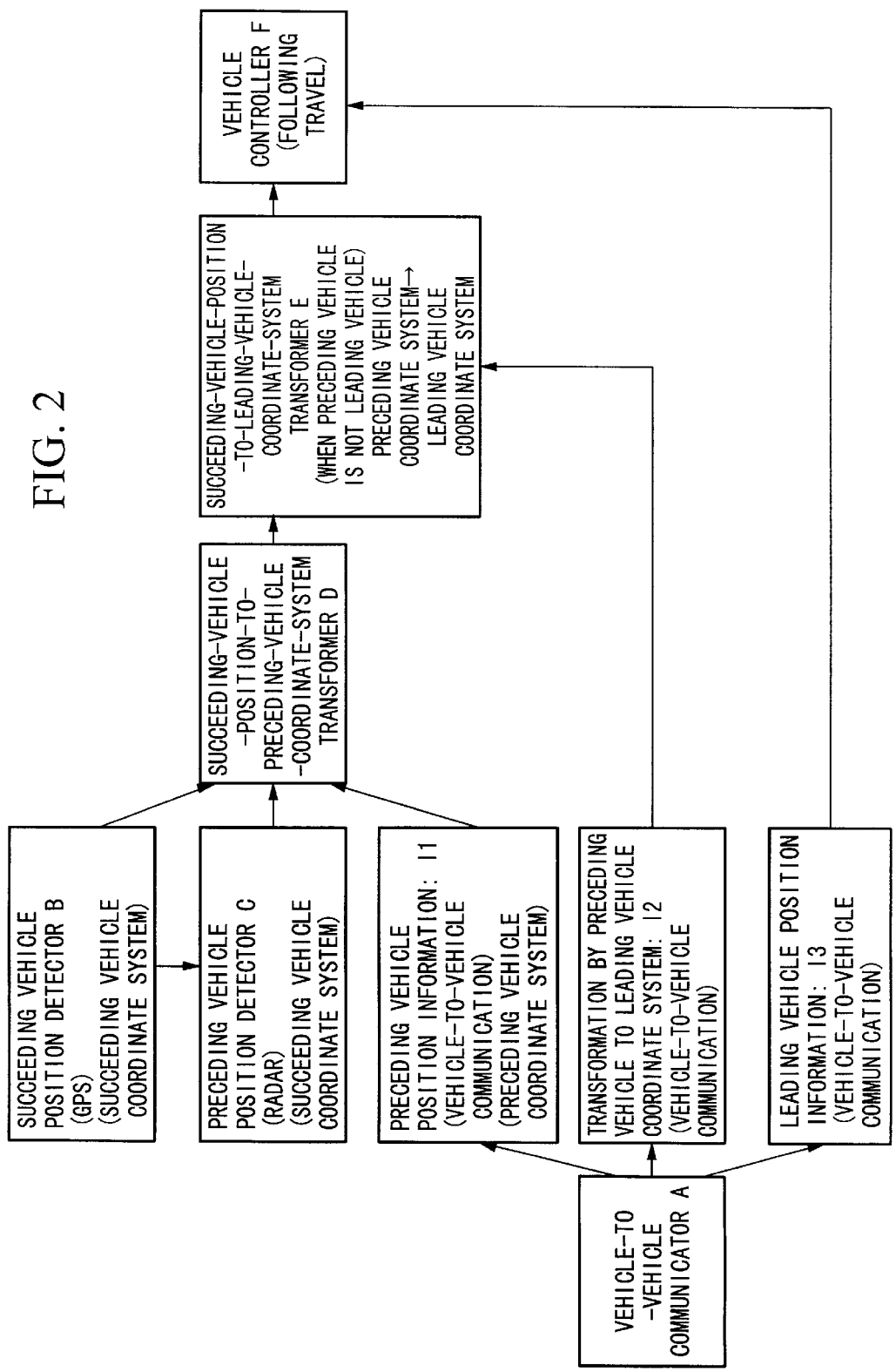
FIG. 2 is a block diagram schematically showing the process carried out by a succeeding vehicle of the first embodiment of the present invention.

FIG. 2 schematically shows the processes carried out in the succeeding vehicles 1".

As shown in this figure, a succeeding vehicle 1" obtains preceding-vehicle-position information I1 in the preceding-vehicle coordinate system, transformation I2 by the preceding vehicle to the leading vehicle coordinate system, and position information I3 of the leading vehicle 1', from the preceding vehicle by vehicle-to-vehicle communication (vehicle-to-vehicle communicator A). This vehicle-to-vehicle communicator A corresponds to the above-described communication unit 31.

The succeeding vehicle (object vehicle) 1" obtains succeeding-vehicle-position information in the succeeding vehicle coordinate system by a succeeding-vehicle-position detector (self position detector) B. This succeeding vehicle position detector B corresponds to the processes carried out by the automatic driving ECU 17 which calculates the succeeding vehicle position information, based on the detection results of the speed sensor 35, the yaw rate sensor 36, and the GPS signal.

Further, the succeeding vehicle 1" obtains preceding-vehicle-position information in the succeeding vehicle coordinate system by a preceding-vehicle-position detector C. This preceding-vehicle-position detector C corresponds to the process carried out by the automatic driving ECU 17 for estimating the position of the preceding vehicle, based on the calculation results of the succeeding vehicle position detector B and on the detection results of the laser radar 6.

Then, the succeeding vehicle 1" calculates the succeeding vehicle position information in the preceding-vehicle coordinate system by a succeeding-vehicle-position-to-preceding-vehicle-coordinate-system transformer D, based on the detection results of the succeeding vehicle position detector B, the detection results of the preceding-vehicle-position detector C, and the preceding-vehicle-position information I1 in the preceding-vehicle coordinate system.

The succeeding vehicle 1" calculates succeeding vehicle position information in the leading vehicle coordinate system by a succeeding-vehicle-position-to-leading-vehicle-coordinate-system transformer E, based on the calculation results of the succeeding-vehicle-position-to-preceding-vehicle-coordinate-system transformer D, and on the transformation I2 by the preceding vehicle to the leading vehicle coordinate system.

The succeeding vehicle 1" follows the leading vehicle 1' by a vehicle controller F, based on the calculation results of the succeeding-vehicle-position-to-leading-vehicle-coordinate-system transformer E and on the position information of the leading vehicle 1'.

The processes carried out in the succeeding vehicle 1", shown in FIG. 2, will now be explained with reference to FIG. 3 in more detail.

Here, the succeeding vehicle 1" is a vehicle ("n"-th vehicle) which is positioned at the "n"-th position from the head of the traveling procession. The vehicle just in front of the n-th vehicle is not the leading vehicle 1' (that is, n>2). The leading vehicle is the first vehicle, and the preceding vehicle is the n−1-th vehicle (which is positioned at the "n−1"-th position from the head of the procession).

Figure 3:
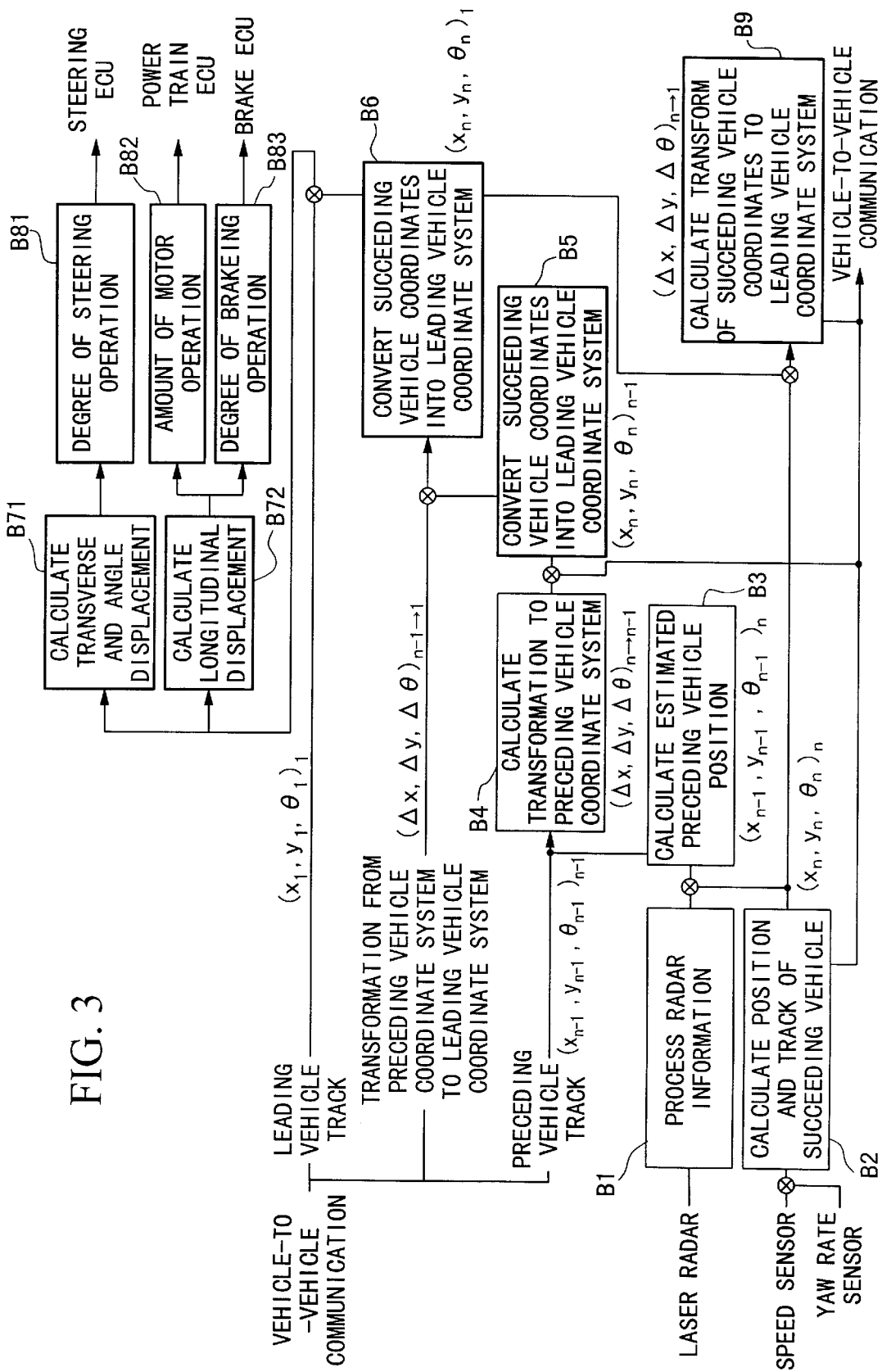
FIG. 3 is a block diagram showing the process carried out by an automatic driving ECU of the succeeding vehicle of the first embodiment of the present invention.

As shown in FIG. 3, the automatic driving ECU 17 of the succeeding vehicle 1" processes the detection results of the laser radar 6 (block B1). After that, the automatic driving ECU 17 calculates the succeeding vehicle position information $(x_n, y_n, \theta_n)_n$ (the present location (center of gravity) and traveling direction) in the coordinate system set in the succeeding vehicle, based on the detection results of the speed sensor 35 and the yaw rate sensor 36, and stores these calculation results as track data in the storage device 22 (block B2). This process of block B2 corresponds to the above-described succeeding vehicle position detector B.

The succeeding vehicle position information calculated in block B2 is transmitted by vehicle-to-vehicle communication to the other electric vehicles 1.

Next, the automatic driving ECU 17 calculates the position information $(x_{n-1}, y_{n-1}, \theta_{n-1})_n$ of the preceding vehicle ("n−1"-th vehicle) in the succeeding vehicle coordinate system ("n"-th vehicle coordinate system), based on the succeeding vehicle position information $(x_n, y_n, \theta_n)_n$ calculated in block B2 and on the processing results of the output from the laser radar 6 in block B1. This process in block B3 corresponds to the above-described preceding-vehicle-position detector C.

By comparing the calculation results $(x_n, y_n, \theta_n)_n$ in block B3 with the position information $(x_{n-1}, y_{n-1}, \theta_{n-1})_n$ of the preceding vehicle ("n−1"-th vehicle), the required transformation from the succeeding vehicle coordinate system to the preceding-vehicle coordinate system, that is, the difference ($\Delta x$, $\Delta y$, $\Delta\theta$)$_{n\to n-1}$ between the coordinate systems of the succeeding vehicle ("n"-th vehicle) and of the preceding vehicle ("n-1"-th vehicle), is calculated (block B4). This position information of the preceding vehicle ($x_{n-1}$, $y_{n-1}$, $\theta_{n-1}$)$_n$ corresponds to the above-described preceding-vehicle-position information I1.

The automatic driving ECU 17 transforms the position information of the succeeding vehicle ("n"-th vehicle) from the succeeding vehicle coordinate system to the preceding-vehicle- ("n-1"-th vehicle-) coordinate system, based on the succeeding vehicle position information ($x_n$, $y_n$, $\theta_n$)$_n$ in the succeeding vehicle coordinate system and the difference ($\Delta x$, $\Delta y$, $\Delta\theta$)$_{n\to n-1}$ for converting the succeeding vehicle coordinate system to the preceding-vehicle coordinate system (block B5). The calculation is given by:

$$(x_n, y_n, \theta_n)_{n-1} = (x_n, y_n, \theta_n)_n + (\Delta x, \Delta y, \Delta\theta)_{n\to n-1} \quad (1')$$

The processes in blocks B4 and B5 correspond to the above-described succeeding-vehicle-position-to-preceding-vehicle-coordinate-system transformer D.

The automatic driving ECU 17 transforms succeeding vehicle position information ($x_n$, $y_n$, $\theta_n$)$_{n-1}$ to that of the leading vehicle coordinate system, based on the succeeding vehicle position (n-th vehicle position) information ($x_n$, $y_n$, $\theta_n$)$_{n-1}$ in the preceding-vehicle- ("n-1"-th vehicle-) coordinate system obtained in block B5 and on the transformation by the preceding vehicle to convert the information into that of the leading vehicle coordinate system obtained by vehicle-to-vehicle communication, that is, the difference ($\Delta x$, $\Delta y$, $\Delta\theta$)$_{n\to 1}$ between the coordinate systems of the leading vehicle and of the preceding vehicle. This process in block B6 corresponds to the above-described succeeding-vehicle-position-to-leading-vehicle-coordinate-system transformer E.

This calculation is given by:

$$(x_n, y_n, \theta_n)_1 = (x_n, y_n, \theta_n)_{n-1} + (\Delta x, \Delta y, \Delta\theta)_{n-1\to 1}. \quad (2)$$

The transformation ($\Delta x$, $\Delta y$, $\Delta\theta$)$_{n\to 1}$ by the preceding vehicle to the leading vehicle coordinate system was calculated by the automatic driving ECU 17 of the preceding vehicle ("n-1"-th vehicle) in block B9 (described later) when performing the process shown in FIG. 2, and corresponds to the transformation 12 to the leading vehicle coordinate system.

The automatic driving ECU 17 calculates the shift in the position of the succeeding vehicle ("n"-th vehicle) from the track of the leading vehicle 1' (the first vehicle), based on the succeeding vehicle position information ($x_n$, $y_n$, $\theta_n$)$_1$ transformed to the leading vehicle coordinate system obtained in block B6 and the track data ($x_n$, $y_n$, $\theta_n$) of the leading vehicle 1' which is obtained by vehicle-to-vehicle communication and is stored in its storage device 22. In block B71, the displacement (transverse displacement: $\Delta Y$) with respect to the direction perpendicular to the traveling direction of the succeeding vehicle ("n"-th vehicle), and the rotational displacement (angle displacement: $\Delta\theta$) in the traveling direction of the succeeding vehicle ("n"-th vehicle) with respect to the traveling direction of the leading vehicle 1' are calculated. In block B72, the displacement (longitudinal displacement: $\Delta X$) in the traveling direction of the succeeding vehicle is calculated. The travel track data ($x_1$, $y_1$, $\theta_1$)$_1$ of the leading vehicle correspond to the position coordinates I3 of the above-described leading vehicle.

The automatic driving ECU 17 calculates the amount of steering operation, based on the transverse displacement $\Delta Y$ and the angle displacement $\Delta\theta$, which was calculated in block B71, according to the program stored in the storage device 22 (block B81). At the same time, the automatic driving ECU 17 calculates the amounts of motor and braking operations, based on the longitudinal displacement $\Delta X$, the amounts of operations of the accelerator pedal 23 and the brake 26 obtained by vehicle-to-vehicle communication, and the speed and acceleration of the leading vehicle 1' (blocks B82 and B83).

The automatic driving ECU 17 transmits the amount of steering operation, calculated in block B81, to the steering ECU 16. The steering ECU 16 adjusts the steering wheel 28 by controlling the steering motor 30, based on the transmitted degree of steering.

The automatic driving ECU 17 transmits the amount of the motor operation, calculated in block B82, to the power train ECU 3. The power train ECU 3 controls the motor 4, based on the transmitted amount of motor operation. The automatic driving ECU 17 transmits the amount of braking, calculated in block B83, to the brake ECU 15. The brake ECU 15 controls the brake 26, based on the transmitted amount of braking.

Thus, the processes in blocks B71, B72, B81, B82, and B83, the control of the steering motor 30 by the steering ECU 16, the control of the motor 4 by the power train ECU 3, and the control of the brake 26 by the brake ECU 15 correspond to the above-described vehicle controller F.

During the processes in blocks B71, B72, B81, B82, and B83, the automatic driving ECU 17 calculates the transformation of the succeeding vehicle position information to the leading vehicle coordinate system, that is, the difference ($\Delta x$, $\Delta y$, $\Delta\theta$)$_{n\to 1}$ between the coordinate systems of the succeeding vehicle ("n"-th vehicle) and the leading vehicle (first vehicle). In this calculation (block B9), the coordinates ($x_n$, $y_n$, $\theta_n$)$_1$ of the succeeding vehicle ("n"-th vehicle) in the leading vehicle (first vehicle) coordinate system, calculated in block B6, are compared with the coordinates ($x_n$, $y_n$, $\theta_n$)$_n$ of the succeeding vehicle in the succeeding vehicle coordinate system obtained in block B2.

The difference ($\Delta x$, $\Delta y$, $\Delta\theta$)$_{n\to 1}$ between the coordinate systems of the succeeding vehicle ("n"-th vehicle) and the leading vehicle (first vehicle), calculated in block B9, is transmitted to the succeeding vehicle 1" ("n+1"-th vehicle) just after the succeeding vehicle by vehicle-to-vehicle communication, and is used in transforming the difference in the coordinate system of the "n+1"-th vehicle.

Figure 4:
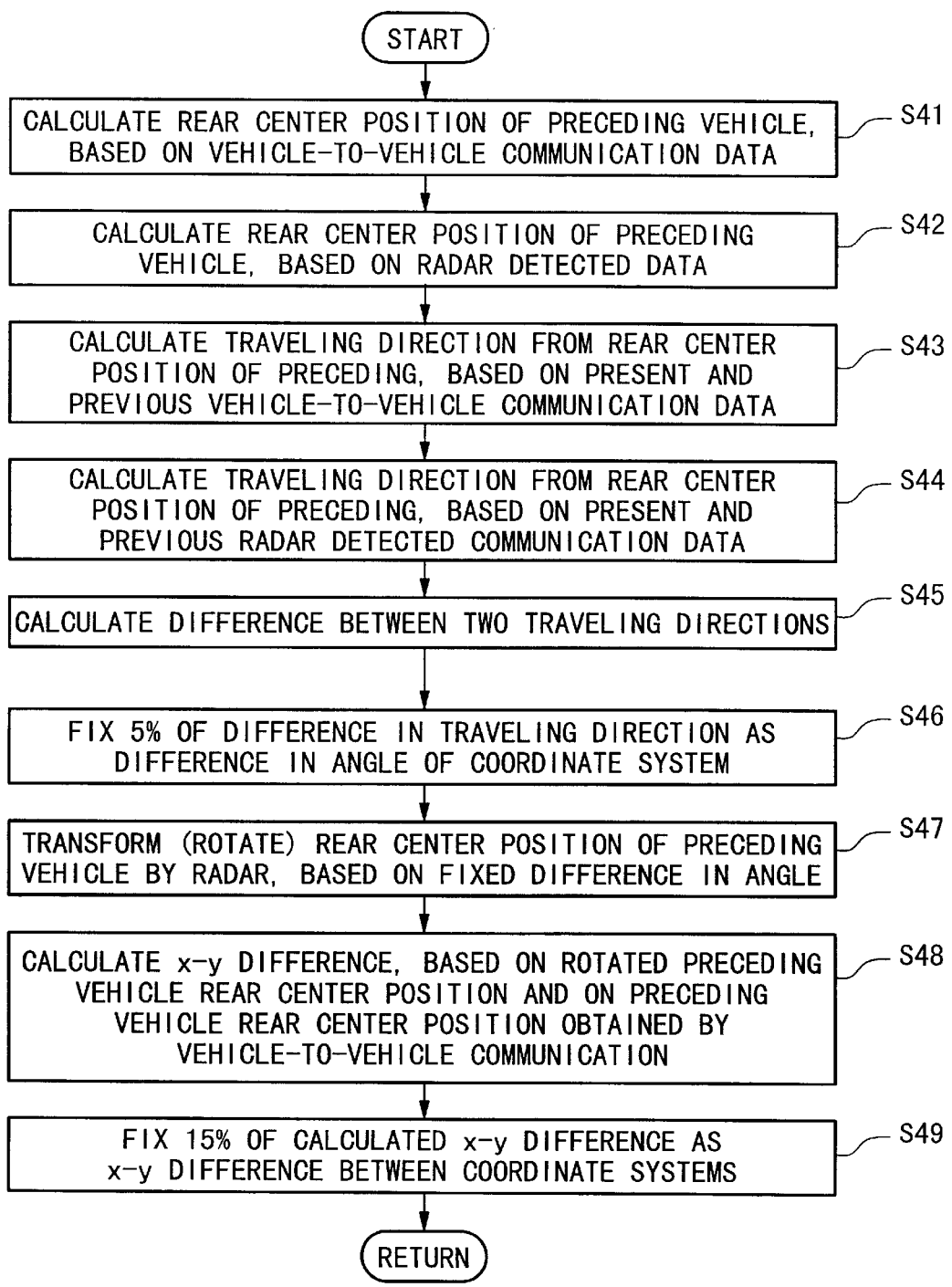
FIG. 4 is a flowchart showing the process in block B4 of FIG. 3.

FIG. 4 is a flowchart showing in detail the process in block B4 for calculating the difference ($\Delta x$, $\Delta y$, $\Delta\theta$)$_{n\to n-1}$ between the coordinate systems of the succeeding vehicle ("n"-th vehicle) and the preceding vehicle ("n-1"-th vehicle).

As shown in FIG. 4, to obtain the difference ($\Delta x$, $\Delta y$, $\Delta\theta$)$_{n\to n-1}$, the rear center position (the center of the reflector 7) of the preceding vehicle in the coordinate system of the preceding vehicle ("n-1"-th vehicle) is calculated, based on the position of the preceding vehicle ("n-1"-th vehicle), obtained by vehicle-to-vehicle communication, and on the length of the electric vehicle 1 (step S41). These calculation results are related to the {X'F(t2), Y'F(t2)} in the background technique.

Subsequently, the rear center position (the center of the reflector 7) of the preceding vehicle in the succeeding vehicle coordinate system is calculated, based on the estimated distance and direction from the succeeding vehicle ("n"-th vehicle) to the preceding vehicle ("n-1"-th vehicle), which was calculated from the output from the laser radar 6 in block B3, on the present location of the succeeding vehicle ("n"-th vehicle) calculated in block B2, and on the length of the electric vehicle 1. These calculation results are related to the {X'FB(t2), Y'FB(t2)} in the background technique.

The traveling direction of the preceding vehicle ("n−1"-th vehicle) is calculated (step S43), based on the vehicle-to-vehicle communication data, that is, two chronologically continuous data which are the calculation results in step S41 and the previous calculation results in step S41 (10 ms ago) shown in FIG. 4(corresponding to {X'F(t1), Y'F(t1)} in the background art). The calculation results are related to θ'F(t1, t2) in the background art.

The traveling direction of the preceding vehicle ("n−1"-th vehicle) is calculated (step S44), based on the radar-detected data, that is, two chronologically continuous data which are the calculation results in step S42 and the previous calculation results in step S42 (10 ms ago) (corresponding to {X'FB(t1), Y'FB(t1)} in the background art). The calculation results are related to θ'FB(t1, t2) in the background art.

The difference between the traveling directions obtained in steps S43 and S44 is calculated. This calculation result is relevant to ΔθFB in the background art (step S45).

A certain percentage (e.g., 5%) of the calculation result in step S45 is employed as the difference in direction $(\Delta\theta)_{n \to n-1}$ between the coordinate systems of the succeeding vehicle ("n"-th vehicle) and of the preceding vehicle ("n−1"-th vehicle) (step S46). The calculation result in step S45 is not used as is, because the detection results of the laser radar 6 includes noise components.

Based on the $(\Delta\theta)_{n \to n-1}$ employed as the difference in step S46, the rear center position of the preceding vehicle ("n−1"-th vehicle) (detected by radar) in the coordinate system of the succeeding vehicle ("n"-th vehicle) calculated in step S42 is transformed (rotated) (step S47).

The differences in the $x^-$ and $y^-$ directions between the preceding vehicle and the succeeding vehicle are calculated, based on the calculation results in step S47, on the rear center position of the preceding vehicle in the preceding-vehicle ("n−1"-th vehicle) coordinate system obtained from the vehicle-to-vehicle communication, and on the rear center position of the preceding vehicle in the succeeding vehicle ("n"-th vehicle) coordinate system obtained from the radar-detected data (step S48). These calculation results are related to the ΔXFB and ΔYFB in the background art.

A certain percentage (e.g., 15%) of the calculation results in step S48 are set as the differences in the $x^-$ and $y^-$ directions $(\Delta x, \Delta y)_{n \to n-1}$ between the coordinate systems of the succeeding vehicle ("n"-th vehicle) and of the preceding vehicle ("n−1"-th vehicle) (step S49), and the flow returns. The calculation results in step S48 are not used as is, because the data includes noise components.

According the above-described procedure, the calculation of the difference $(\Delta x, \Delta y, \Delta\theta)_{n-1 \to 1}$ between the succeeding vehicle coordinate system and the preceding-vehicle coordinate system in block B4 is completed.

Figure 5:
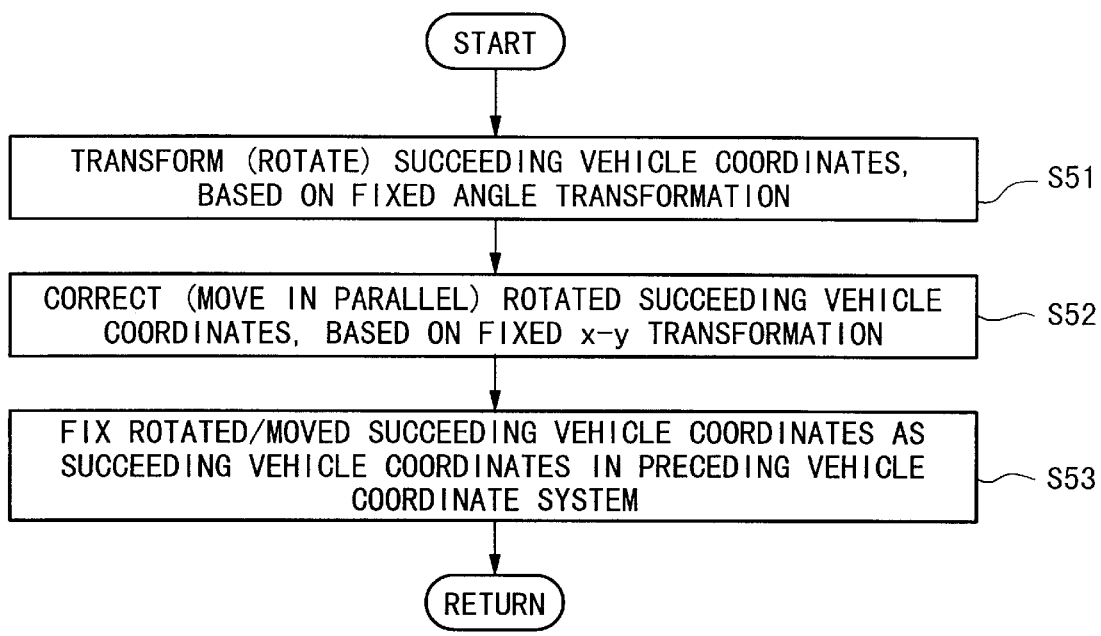
FIG. 5 is a flowchart showing the process in block B5 of FIG. 3.

FIG. 5 shows the details of the conversion of the coordinates of the succeeding vehicle ("n"-th vehicle) into the values in the coordinate systems in the preceding vehicle ("n−1"-th vehicle).

First, based on the $(\Delta\theta)_{n \to n-1}$ set as the difference (transformation in angle) in step S46 between the coordinate systems of the succeeding vehicle and of the preceding vehicle, the succeeding vehicle position $(x_n, y_n, \theta_n)_n$ in the succeeding vehicle coordinate system is transformed (rotated) (step S51).

Based on the $(\Delta x, \Delta y)_{n \to n-1}$ set as the difference in the $x^-$ and $y^-$ directions in step S49 between the coordinate systems, the calculation result in step S51 is transformed (moved in parallel) (step S52).

The succeeding vehicle coordinates which have been rotated and moved in parallel are set as the succeeding vehicle ("n"-th vehicle) coordinates $(x_n, y_n, \theta_n)_{n-1}$ in the preceding-vehicle ("n−1"-th vehicle) coordinate system (step S53), and the flow returns.

Figure 6:
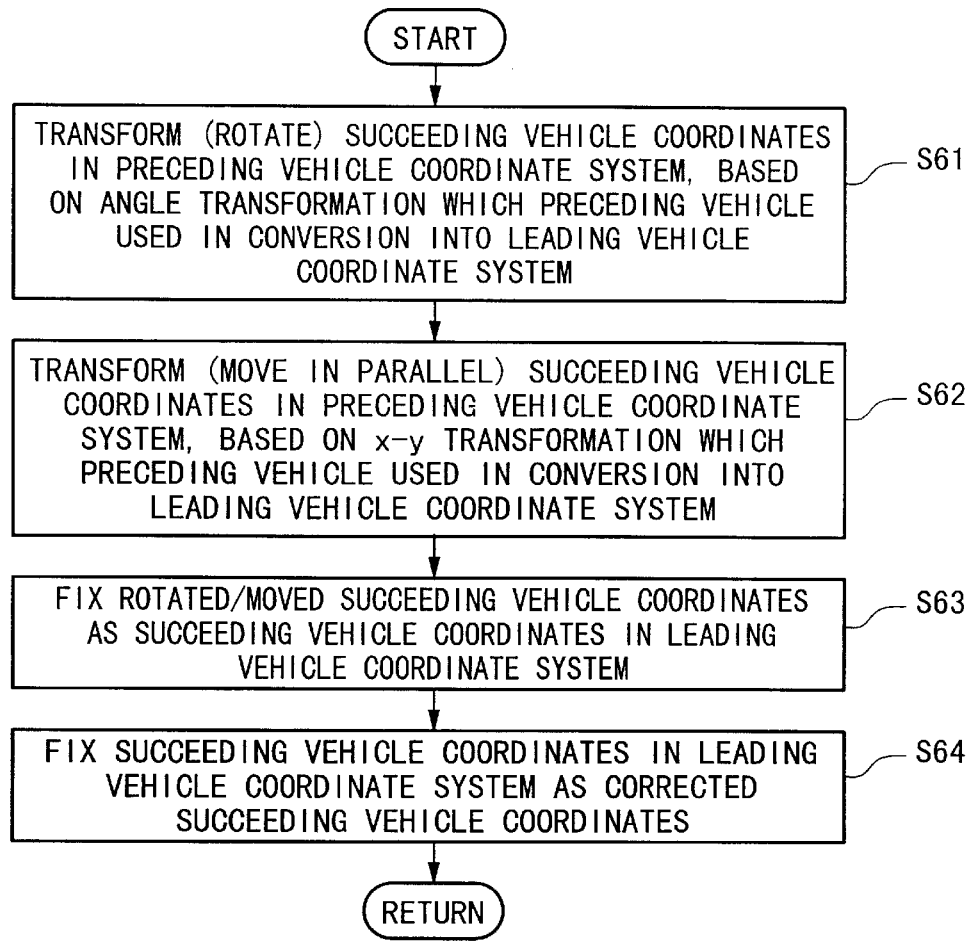
FIG. 6 is a flowchart showing the process in block B6 of FIG. 3.

FIG. 6 shows the details of the conversion of the coordinates of the succeeding vehicle ("n"-th vehicle) into the coordinate system of the leading vehicle 1' (first vehicle) in block B6.

Using the difference in direction $(\Delta\theta)_{n-1 \to n}$ between the coordinate systems of the preceding vehicle and the leading vehicle which the preceding vehicle ("n−1"-th vehicle) has used to convert the coordinates of the succeeding vehicle ("n−1"-th vehicle) into the coordinate system of the leading vehicle (first vehicle), the value set in step S53 as the coordinates $(\Delta x, \Delta y, \Delta\theta)_{n-1}$ of the succeeding vehicle ("n"-th vehicle) in the coordinate system of the preceding vehicle ("n−1"-th vehicle) is transformed (rotated) (step S61).

Using the differences in the $x^-$ and $y^-$ directions $(\Delta x, \Delta y)_{n-1 \to n}$ between the coordinate systems of the preceding vehicle and the leading vehicle which the preceding vehicle ("n−1"-th vehicle) has used to convert the coordinates of the succeeding vehicle ("n−1"-th vehicle) into the coordinate system of the leading vehicle 1' (first vehicle), the calculation result in step S61 is transformed (moved in parallel) (step S62).

The transformed succeeding vehicle coordinates, which has been rotated and moved in parallel are set as the coordinates $(x_n, y_n, \theta_n)_1$ of the succeeding vehicle ("n"-th vehicle) in the coordinate system of the leading vehicle (first vehicle) 1' (step S63).

The value $(x_n, y_n, \theta_n)_1$ set in step S63 is used as the transformed succeeding vehicle coordinates (step S64).

Figure 7:
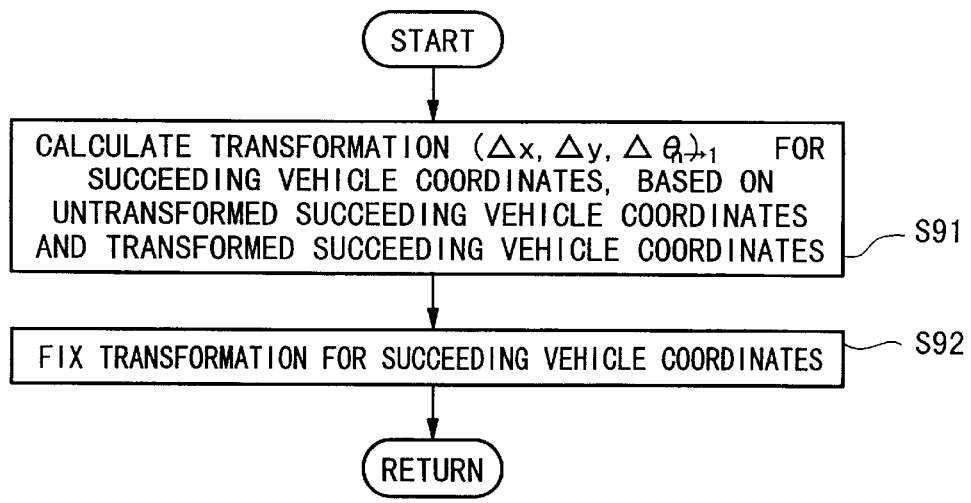
FIG. 7 is a flowchart showing the process in block B9 of FIG. 3.

FIG. 7 shows the detail of the procedure for calculating the difference between the coordinate systems of the succeeding vehicle ("n"-the vehicle) and the leading vehicle (first vehicle) (transformation from the succeeding vehicle coordinates to the leading vehicle coordinates).

According to the $(x_n, y_n, \theta_n)_1$ set as the transformed succeeding vehicle coordinate in step S64, and the succeeding vehicle coordinates $(x_n, y_n, \theta_n)_n$ obtained in block B2 in the succeeding vehicle coordinate system, the difference $(\Delta x, \Delta y, \Delta\theta)_{n \to 1}$ between the coordinate systems of the succeeding vehicle ("n"-th vehicle) and the leading vehicle 1' (first vehicle) is calculated by (step S91):

$$(\Delta x, \Delta y, \Delta\theta)_{n \to 1} = (x_n, y_n, \theta_n)_1 - (x_n, y_n, \theta_n)_n. \quad (3)$$

From the formulas (1') and (2), $$(x_n, y_n, \theta_n)_1 = \{(x_n, y_n, \theta_n)_n + (\Delta x, \Delta y, \Delta\theta)_{n \to n-1}\} + (\Delta x, \Delta y, \Delta\theta)_{n-1 \to 1} \quad (4)$$

Accordingly, the formula (3) is equivalent to:

$$(\Delta x, \Delta y, \Delta\theta)_{n \to 1} = (\Delta x, \Delta y, \Delta\theta)_{n \to n-1} + (\Delta x, \Delta y, \Delta\theta)_{n-1 \to 1} \quad (5)$$

Therefore, the difference $(\Delta x, \Delta y, \Delta\theta)_{n \to 1}$ between the coordinate systems of the succeeding vehicle ("n"-th vehicle) and of the leading vehicle (first vehicle) is based on the difference $(\Delta x, \Delta y, \Delta\theta)_{n-1 \to 1}$ between the coordinate systems of the preceding vehicle ("n−1"-th vehicle) and the leading vehicle (first vehicle).

The calculated values are employed as the transformation of the succeeding vehicle coordinates to the leading vehicle coordinate system (step S92), and the flow returns. The values set in step S92 are transmitted to the succeeding vehicle ("n+1"-th vehicle) by vehicle-to-vehicle communication.

As described above, in the automatic following travel system 10, when calculating the position $(x_n, y_n, \theta_n)_1$ of the succeeding vehicle ("n"-th vehicle) in the coordinate system of the first vehicle (leading vehicle), the "n"-th vehicle refers by vehicle-to-vehicle communication to the difference $(\Delta x, \Delta y, \Delta \theta)_{n-1 \to 1}$ between the coordinate systems of the first vehicle and the "n−1"-th vehicle calculated by the automatic driving ECU 17 of the preceding vehicle ("n−1"-th vehicle) in block B9. Then, the preceding vehicle calculates:

$$(x_n, y_n, \theta_n)_1 = (x_n, y_n, \theta_n)_{n-1} + (\Delta x, \Delta y, \Delta \theta)_{n-1 \to 1}. \quad (2)$$

Therefore, when calculating $(x_n, y_n, \theta_n)_1$, it is not necessary to obtain the differences between pairs of sequential vehicles $(\Delta x, \Delta y, \Delta \theta)_{2 \to 1}$, $(\Delta x, \Delta y, \Delta \theta)_{3 \to 2}$, $(\Delta x, \Delta y, \Delta \theta)_{4 \to 3}$, ... $(\Delta x, \Delta y, \Delta \theta)_{n-1 \to n-2}$, thereby reducing the capacities of the buffers for the vehicle-to-vehicle communication. Further, because it is not necessary to add up the differences between pairs of sequential vehicles $(\Delta x, \Delta y, \Delta \theta)_{2 \to 1}$, $(\Delta x, \Delta y, \Delta \theta)_{3 \to 2}$, $(\Delta x, \Delta y, \Delta \theta)_{4 \to 3}$, ... $(\Delta x, \Delta y, \Delta \theta)_{n-1 \to n-2}$, the calculation load can be reduced. Thus, this invention reduces the load on the CPUs and enable quick control.

Further, the automatic following travel system 10 produces the difference $(\Delta x, \Delta y, \Delta \theta)_{n \to 1}$ between the coordinate systems of the succeeding vehicle ("n"-th vehicle) and the leading vehicle (first vehicle) calculated in block B9, based on the difference $(\Delta x, \Delta y, \Delta \theta)_{n-1 \to 1}$ between the coordinate systems of the preceding vehicle ("n−1"-th vehicle) and the leading vehicle (first vehicle) calculated by the preceding vehicle ("n−1"-th vehicle). Therefore, the load due to this calculation of the $(\Delta x, \Delta y, \Delta \theta)_{n \to 1}$ is not high. Moreover, because this calculation method is applied to all the electric vehicles of n>2, the difference $(\Delta x, \Delta y, \Delta \theta)_{n \to 1}$ between the coordinate systems of the "n"-th vehicle and of the first vehicle is based on all the differences $(\Delta x, \Delta y, \Delta \theta)_{2 \to 1}$, $(\Delta x, \Delta y, \Delta \theta)_{3 \to 2}$, $(\Delta x, \Delta y, \Delta \theta)_{4 \to 3}$, ... $(\Delta x, \Delta y, \Delta \theta)_{n-1 \to n-2}$ which were used in the conversion of the respective vehicle positions to the leading vehicle coordinate system by the second to "n−1"-th vehicles. The problem of the asynchrony in data can be therefore prevented.

Further, in the automatic following travel system 10, when calculating the difference $(\Delta x, \Delta y, \Delta \theta)_{n \to 1}$ between the coordinate systems of the succeeding vehicle ("n"-th vehicle) and of the leading vehicle (first vehicle), the automatic driving ECU 17 performs, based on the succeeding vehicle position $(x_n, y_n, \theta_n)_n$ in the coordinate system of the succeeding vehicle ("n"-th vehicle) obtained in block B1 and on the succeeding vehicle position $(x_n, y_n, \theta_n)_1$ in the coordinate system of the leading vehicle (first vehicle) obtained in block B6, the following calculation:

$$(\Delta x, \Delta y, \Delta \theta)_{n \to 1} = (x_n, y_n, \theta_n)_1 - (x_n, y_n, \theta_n)_n. \quad (3)$$

Therefore, the calculation load in block B9 is low, and the load on the CPUs or the like can be reduced.

This invention may be embodied in other forms or carried out in other ways without departing from the spirit thereof.

While in the above-described embodiment the automatic driving ECU 17 uses the formula (3) to compute the difference $(\Delta x, \Delta y, \Delta \theta)_{n \to 1}$, the difference $(\Delta x, \Delta y, \Delta \theta)_{n \to n-1}$, between the coordinate systems of the preceding vehicle and the succeeding vehicle obtained by the succeeding vehicle may be directly added to the difference $(\Delta x, \Delta y, \Delta \theta)_{n-1 \to 1}$, between the coordinate systems of the preceding vehicle and of the leading vehicle obtained from the preceding vehicle by vehicle-to-vehicle communication, to calculate the difference $(\Delta x, \Delta y, \Delta \theta)_{n \to 1}$.

Second Embodiment

The second embodiment of the present invention will be explained. The automatic following travel system of the second embodiment has the same structure as shown in FIG. 1. In the description of the second embodiment, the same reference numbers are employed to designate like parts in FIG. 1 and a detailed description is omitted.

Figure 12:
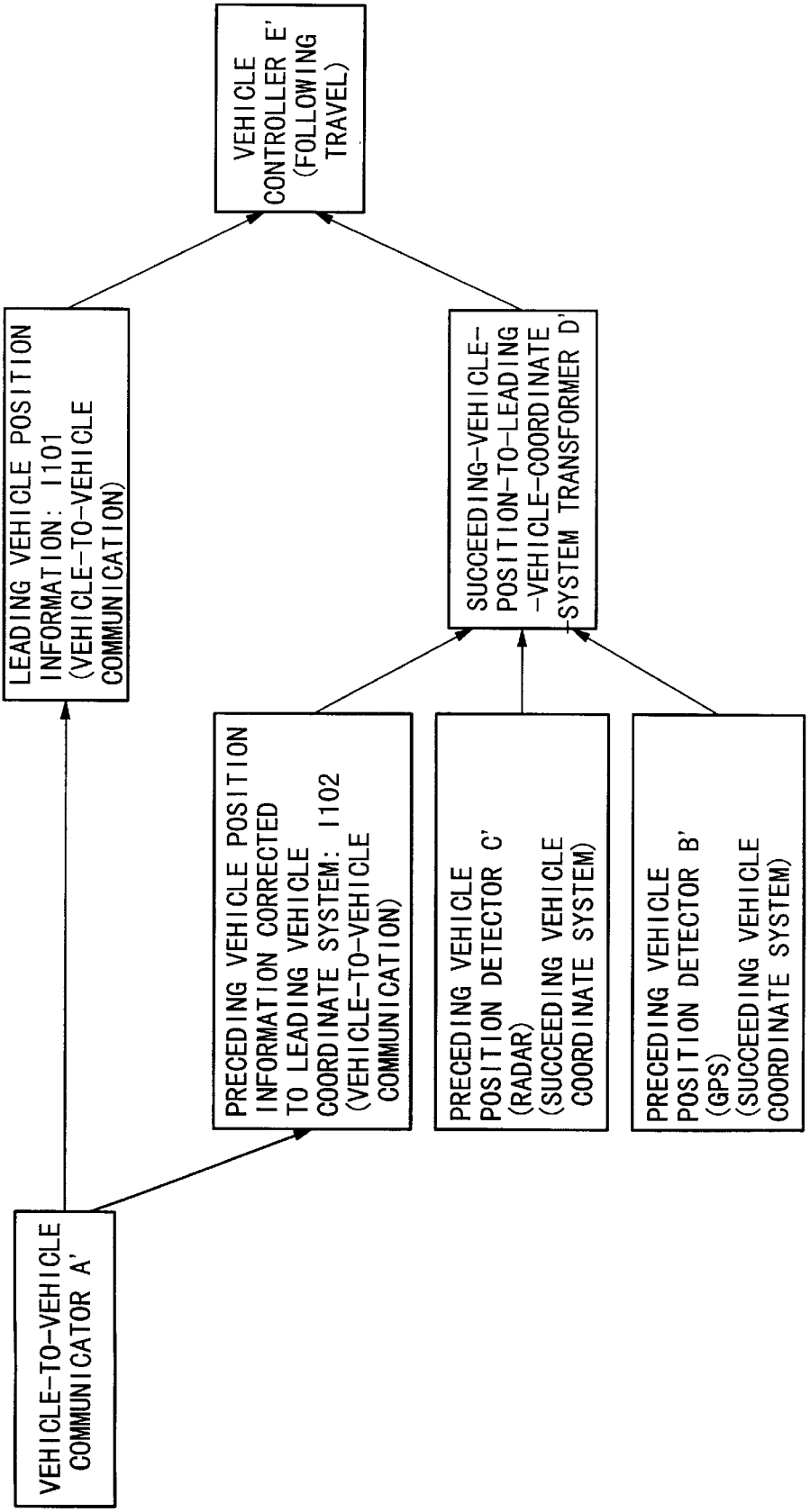
FIG. 12 is a block diagram schematically showing the process carried out by the succeeding vehicle of the second embodiment of the present invention.

FIG. 12 schematically shows the process carried out in the succeeding vehicle 1".

As shown in this figure, the succeeding vehicle 1" obtains leading vehicle position information I101 in the leading vehicle coordinate system, and transformed preceding-vehicle-position information I102 in the leading vehicle coordinate system, by vehicle-to-vehicle communication (vehicle-to-vehicle communicator A') from the preceding vehicle. This vehicle-to-vehicle communicator A' corresponds to the above-described communication unit 31.

The succeeding vehicle 1" obtains succeeding vehicle position information in the succeeding vehicle coordinate system by a succeeding vehicle position detector B'. This succeeding vehicle position detector B' corresponds to the processes carried out by the automatic driving ECU 17 which calculates the succeeding vehicle position information, based on the detection results of the speed sensor 35, the yaw rate sensor 36, and the GPS signal.

Further, the succeeding vehicle 1" obtains preceding-vehicle-position information in the succeeding vehicle coordinate system by a preceding-vehicle-position detector C'. This preceding-vehicle-position detector C' corresponds to the process carried out by the automatic driving ECU 17 for estimating the position of the preceding vehicle, based on the calculation results of the succeeding vehicle position detector B' and on the detection results of the laser radar 6.

Then, the succeeding vehicle 1" transforms the succeeding vehicle position information to the leading vehicle coordinate system by a succeeding-vehicle-position-to-leading-vehicle-coordinate-system transformer D', based on the detection results of the succeeding vehicle position detector B', the detection results of the preceding-vehicle-position detector C', and the preceding-vehicle-position information I102 in the leading vehicle coordinate system.

The succeeding vehicle 1" follows the leading vehicle 1' by a vehicle controller E', based on the calculation results of the succeeding vehicle position-to-leading-vehicle-coordinate-system transformer D' and on the position information I101 of the leading vehicle 1' obtained by vehicle-to-vehicle communication.

The process carried out in the succeeding vehicle 1", shown in FIG. 12, will be explained in more detail with reference to FIG. 13.

Here, the succeeding vehicle 1" is a vehicle (the "n"-th vehicle) which is positioned at the "n"-th position from the head of the traveling procession. The vehicle just in front of the "n"-th vehicle is not the leading vehicle 1' (that is, n>2). The leading vehicle is the first vehicle, and the preceding vehicle is the "n−1"-th vehicle (which is positioned at the "n−1"-th position from the head of the procession).

Figure 13:
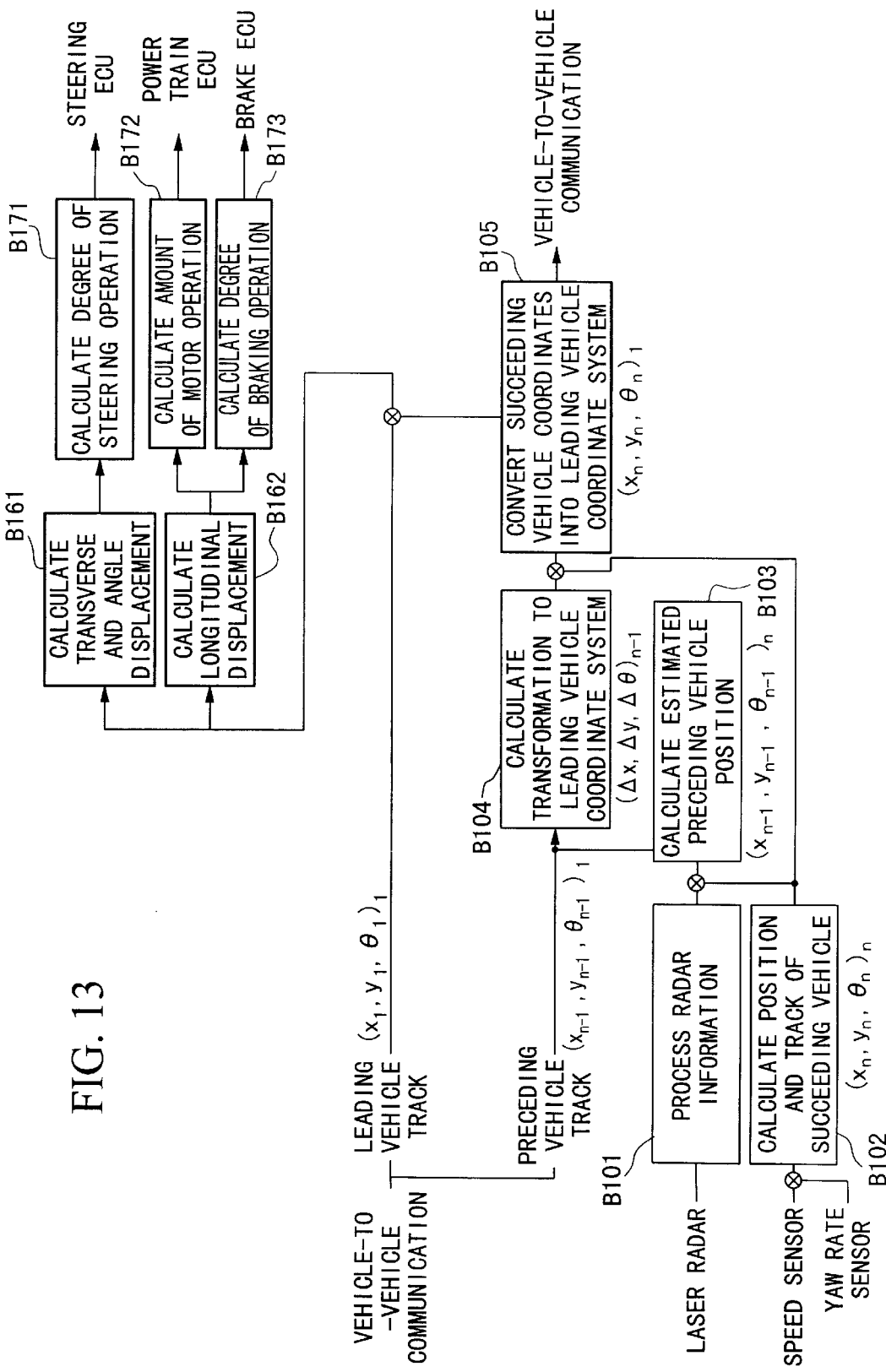
FIG. 13 is a block diagram showing the process carried out by an automatic driving ECU of the succeeding vehicle of the second embodiment of the present invention.

As shown in FIG. 13, the automatic driving ECU 17 processes the detection results of the laser radar 6, and calculates the estimated distance and direction from the succeeding vehicle to the vehicle just in front ("n−1"-th vehicle).

After that, the automatic driving ECU 17 calculates the succeeding vehicle position information $(x_n, y_n, \theta_n)_n$ (the present location (center of gravity and traveling direction)) in the coordinate system set in the succeeding vehicle, based on the detection results of the speed sensor 35 and the yaw rate sensor 36, and stores these calculation results as first track data T1 in the storage device 22 (block B102). This process of block B102 corresponds to the above-described succeeding vehicle position detector B'.

Next, the automatic driving ECU 17 calculates the position information $(x_{n-1}, y_{n-1}, \theta_{n-1})_n$ of the preceding vehicle (the "n−1"-th vehicle) in the succeeding vehicle coordinate system (the "n"-th vehicle coordinate system), based on the succeeding vehicle position information $(x_n, y_n, \theta_n)_n$ calculated in block B102 and on the processing results of the output from the laser radar 6 in block B101 (block B103). This process in block B103 corresponds to the above-described preceding-vehicle-position detector C'.

Subsequently, the automatic driving ECU 17 calculates transformation from the succeeding vehicle coordinate system to the leading vehicle coordinate system, that is, the difference $(\Delta x, \Delta y, \Delta \theta)_{n \to 1}$ between the succeeding vehicle coordinate system and the leading vehicle coordinate system, based on a comparison of the calculation result in block B103 with the second track data T2 which is stored in the storage device 22 of the preceding vehicle ("n−1"-th vehicle) and is obtained by vehicle-to-vehicle communication (block B104). This second track data T2 of the preceding vehicle ("n−1"-th vehicle) was calculated in block B105 (described later) in the process shown in FIG. 12 by the automatic driving ECU 17 of the preceding vehicle, and has been stored in the storage device 22 of the preceding vehicle ("n−1"-th vehicle). The second track data is the position information $(x_{n-1}, y_{n-1}, \theta_{n-1})_1$ of the preceding vehicle ("n−1"-th vehicle) transformed to the leading vehicle coordinate system. Therefore, by comparing this second track data with the calculation result $(x_{n-1}, y_{n-1}, \theta_{n-1})_n$ in block B103, the transformation $(\Delta x, \Delta y, \Delta \theta)_{n \to 1}$ from the succeeding vehicle ("n"-th vehicle) coordinate system to leading vehicle coordinate system can be obtained in block B104. This second track data of the preceding vehicle corresponds to the above-described preceding-vehicle-position information I102.

Then, the automatic driving ECU 17 transforms the succeeding vehicle position $(x_n, y_n, \theta_n)_n$ in the succeeding vehicle ("n"-th-vehicle) coordinate system, obtained in block B102, to $(x_n, y_n, \theta_n)_1$ in the leading vehicle (first vehicle) coordinate system, based on the calculation results $(\Delta x, \Delta y, \Delta \theta)_{n \to 1}$ in block B104.

This calculation (block B105) is:

$$(x_n, y_n, \theta_n)_1 = (x_n, y_n, \theta_n)_n + (\Delta x, \Delta y, \Delta \theta)_{n \to 1}. \tag{2-4}$$

Further, the automatic driving ECU 17 stores the transformed succeeding vehicle position $(x_n, y_n, \theta_n)_1$ in the leading vehicle (first vehicle) coordinate system in the storage device 22 as the second track data T2. The second track data T2 is transmitted to the succeeding "n+1"-th vehicle by vehicle-to-vehicle communication, and is used in the process in block B104 by the automatic driving ECU 17 of the "n+1"-th vehicle.

The processes in blocks B104 and B105 correspond to the above-described succeeding-vehicle-position-to-the-leading-vehicle transformer D'.

The automatic driving ECU 17 calculates the shift in the position of the succeeding vehicle ("n"-th vehicle) from the track of the leading vehicle 1' (first vehicle), based on the succeeding vehicle position $(x_n, y_n, \theta_n)_1$ transformed to the leading vehicle coordinate system obtained in block B105 and the first track data T1 $(x_1, y_1, \theta_1)_1$ of the leading vehicle 1' which is obtained by vehicle-to-vehicle communication. In block B161, the displacement (transverse displacement: $\Delta Y$) with respect to the direction perpendicular to the traveling direction of the succeeding vehicle ("n"-th vehicle), and the rotational displacement (angle displacement: $\Delta \theta$) in the traveling direction of the succeeding vehicle ("n"-th vehicle) with respect to the traveling direction of the leading vehicle 1' are calculated. In block B162, the displacement (longitudinal displacement: $\Delta X$) in the traveling direction of the succeeding vehicle is calculated. The travel track data $(x_1, y_1, \theta_1)_1$ of the leading vehicle correspond to the position coordinates I101 of the above-described leading vehicle.

The automatic driving ECU 17 calculates the degree of steering, based on the transverse displacement $\Delta Y$ and the angle displacement $\Delta \theta$, which was calculated in block B161, according to the program stored in the storage device 22 (block B171). At the same time, the automatic driving ECU 17 calculates the required amounts of motor and brake operations, based on the longitudinal displacement $\Delta X$, the degrees of operations of the accelerator pedal 23 and the brake 26 obtained by vehicle-to-vehicle communication, and the speed and acceleration of the leading vehicle 1' (blocks B172 and B173).

The automatic driving ECU 17 transmits the degree of steering, calculated in block B171, to the steering ECU 16. The steering ECU 16 adjusts the steering wheel 28 by controlling the steering motor 30, based on the transmitted degree of steering.

The automatic driving ECU 17 transmits the amount of motor operation, calculated in block B172, to the power train ECU 3. The power train ECU 3 controls the motor 4, based on the transmitted degree of motor operation. The automatic driving ECU 17 transmits the amount of braking, calculated in block B173, to the brake ECU 15. The brake ECU 15 controls the brake 26, based on the transmitted amount of braking.

Thus, the processes in blocks B161, B162, B171, B172, and B173, the control of the steering motor 30 by the steering ECU 16, the control of the motor 4 by the power train ECU 3, and the control of the brake 26 by the brake ECU 15 correspond to the above-described vehicle controller E'.

Figure 14:
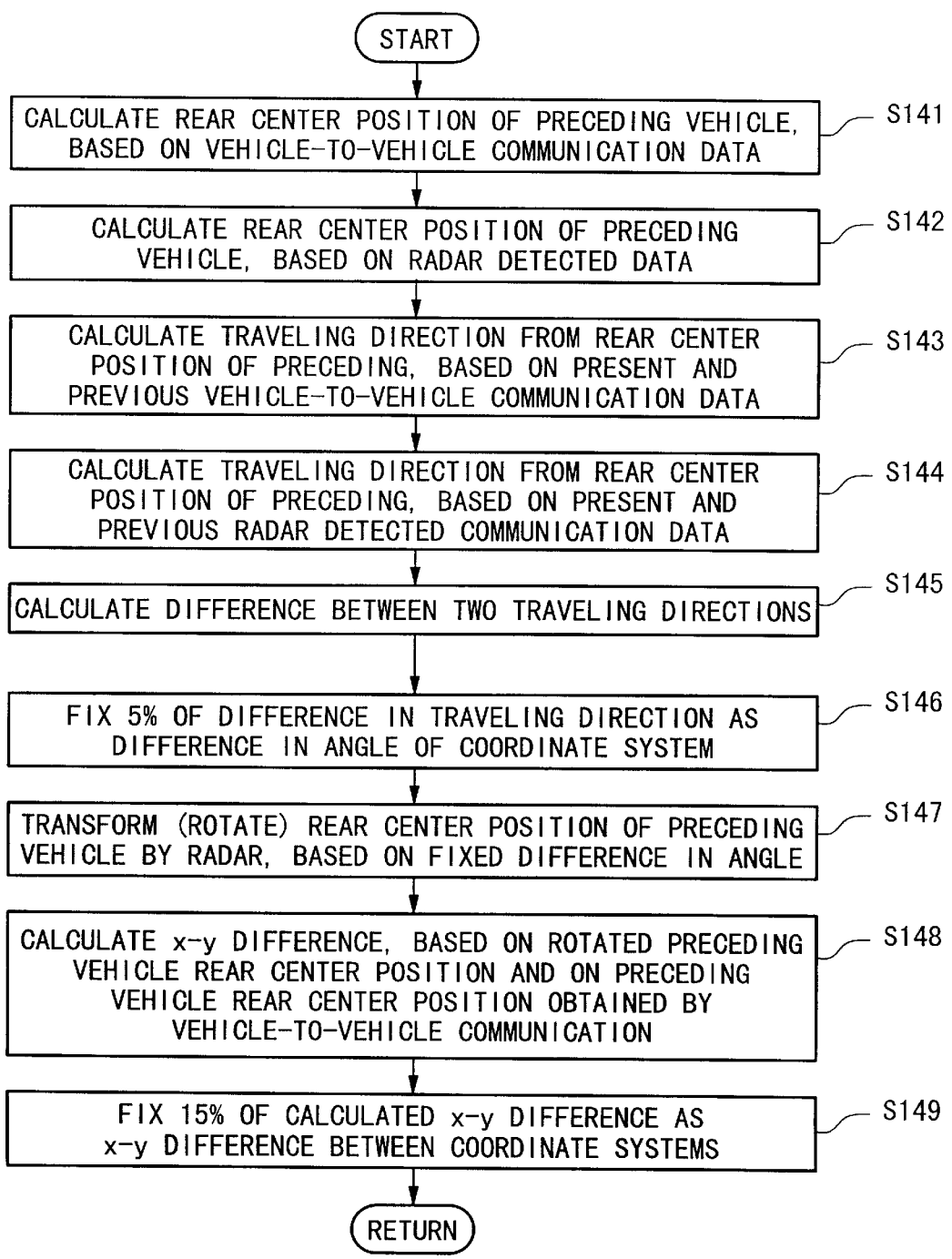
FIG. 14 is a flowchart showing the process in block B104 of FIG. 13.

FIG. 14 is a flowchart showing in detail the process in block B104 for calculating the difference $(\Delta x, \Delta y, \Delta \theta)_{n \to 1}$ between the coordinate systems of the succeeding vehicle ("n"-th vehicle) and the leading vehicle (first vehicle).

As shown in FIG. 14, to obtain the difference $(\Delta x, \Delta y, \Delta \theta)_{n \to 1}$, the rear center position (the center of the reflector 7) of the preceding vehicle in the coordinate system of the leading vehicle (first vehicle) is calculated, based on the second track data T2 of the preceding vehicle ("n−1"-th vehicle), obtained by vehicle-to-vehicle communication, and on the length of the electric vehicle 1 (step S141). These calculation results are related to the $\{X'F(t2), Y'F(t2)\}$ in the background technique.

Subsequently, the rear center position (the center of the reflector 7) of the preceding vehicle in the preceding-vehicle ("n−1"-th vehicle) coordinate system is calculated, based on the preceding-vehicle ("n−1"-th vehicle) position $(x_{n-1}, y_{n-1}, \theta_{n-1})_n$, which was calculated in block B103, and on the length of the electric vehicle 1. These calculation results are related to the $\{X'FB(t2), Y'FB(t2)\}$ in the background technique.

The traveling direction of the preceding vehicle ("n−1"-th vehicle) is calculated, based on the vehicle-to-vehicle communication data, that is, two chronologically continuous data which are the calculation results in step S141 and the previous calculation results in step S141 in the process shown in FIG. 14 (10 ms. ago) (corresponding to $\{X'F(t1),$ Y'F(t1)} in the background art) (step S143). The calculation results are related to θ'F(t1, t2) in the background art.

The traveling direction of the preceding vehicle ("n−1"-th vehicle) is calculated, based on the radar-detected data, that is, two chronologically continuous data which are the calculation results in step S142 and the previous calculation results in step S142 in the process shown in FIG. 13 (10 ms ago) (corresponding to {X'FB(t1), Y'FB(t1)} in the background art) (step S144). The calculation results are related to θ'FB(t1, t2) in the background art.

The difference between the traveling directions obtained in steps S143 and S144 is calculated. This calculation result is relevant to ΔθFB in the background art (step S145).

A certain percentage (e.g., 5%) of the calculation results in step S145 is employed as the difference in direction $(\Delta\theta)_{n\to n-1}$ between the coordinate systems of the succeeding vehicle ("n"-th vehicle) and of the preceding vehicle ("n−1"-th vehicle) (step S146). The calculation result in step S145 is not used as is, because the detection results of the laser radar 6 includes noise components.

Based on the $(\Delta\theta)_{n\to n-1}$ employed as the difference in step S146, the rear center position of the preceding vehicle ("n−1"-th vehicle) (detected by radar) in the coordinate system of the succeeding vehicle ("n"-th vehicle) calculated in step S142 is transformed (rotated) (step S147).

The differences in the $x^{31}$ and $y^-$ directions between the leading vehicle and the succeeding vehicle are calculated, based on the calculation results in step S147, on the rear center position of the preceding vehicle in the leading vehicle (first vehicle) coordinate system obtained from the vehicle-to-vehicle communication, and on the rear center position of the preceding vehicle in the succeeding vehicle ("n"-th vehicle) coordinate system obtained from the radar-detected data (step S148). These calculation results are related to the ΔXFB and ΔYFB in the background art.

A certain percentage (e.g., 15%) of the calculation results in step S148 are employed as the differences in the $x^-$ and $y^-$ directions $(\Delta x, \Delta y)_{n\to n-1}$ between the coordinate systems of the succeeding vehicle ("n"-th vehicle) and of the preceding vehicle ("n−1"-th vehicle) (step S149), and the flow returns. The calculation results in step S148 are not used as is, because the data includes noise components.

According the above-described procedure, the calculation of the difference $(\Delta x, \Delta y, \Delta\theta)_{n\to n-1}$ $((\Delta x, \Delta y, \Delta\theta)_{n-1\to 1})$ between the succeeding vehicle coordinate system and the preceding-vehicle coordinate system in block B104 is completed.

Figure 15:
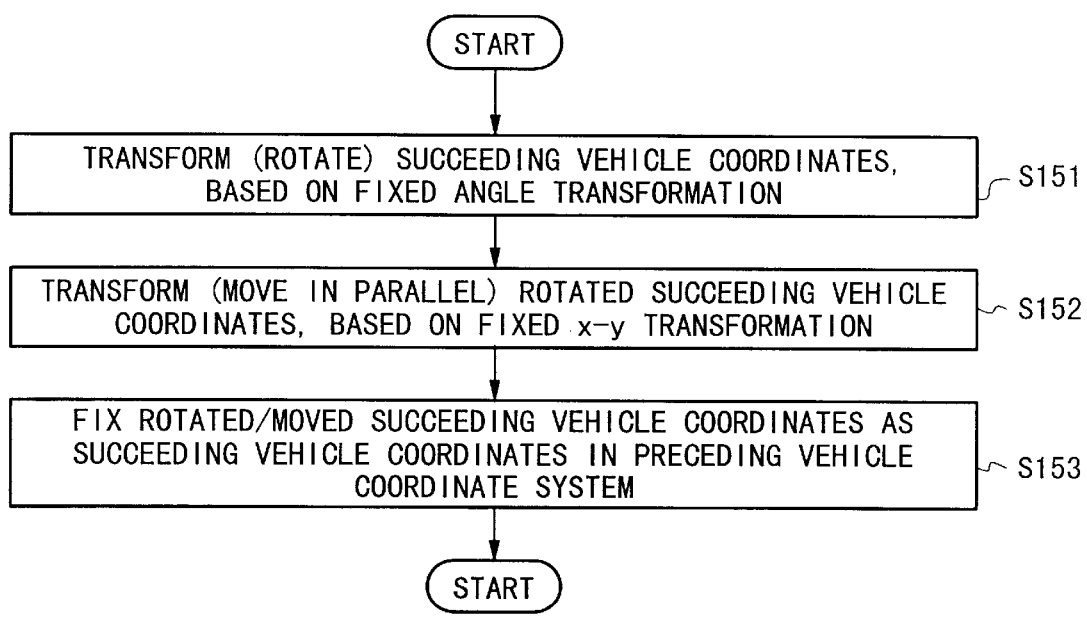
FIG. 15 is a flowchart showing the process in block B105 of FIG. 13.

FIG. 15 shows the detail of the conversion of the coordinates of the succeeding vehicle ("n"-th vehicle) into the values in the coordinate systems in the leading vehicle (first vehicle).

First, based on the $(\Delta\theta)_{n\to n-1}$ set as the difference (transformation in angle) in step S146 between the coordinate systems of the succeeding vehicle and of the preceding vehicle, the succeeding vehicle position $(x_n, y_n, \theta_n)_n$ in the succeeding vehicle coordinate system is transformed (rotated) (step S151).

Based on the $(\Delta x, \Delta y)_{n\to n-1}$ set as the difference in the $x^-$ and $y^-$ directions in step S149 between the coordinate systems, the calculation result in step S151 is transformed (moved in parallel) (step S152).

The succeeding vehicle coordinates which was rotated and moved in parallel are set as the succeeding vehicle ("n"-th vehicle) coordinates $(x_n, y_n, \theta_n)_1$ in the leading vehicle (first vehicle) coordinate system (step S153), and the flow returns.

As described above, when the "n"-th vehicle which is the succeeding vehicle 1" calculates the $(\Delta x, \Delta y, \Delta\theta)_{n\to 1}$ in block B104, the automatic following travel system 10 uses $(x_{n-1}, y_{n-1}, \theta_{n-1})_n$, which was calculated by the automatic driving ECU 17 of the succeeding vehicle ("n"-th vehicle), and the $(x_{n-1}, y_{n-1}, \theta_{n-1})_1$ which has been stored in the storage device 22 of the preceding vehicle ("n−1"-th vehicle) as the second track data T2. Because $(x_{n-1}, y_{n-1}, \theta_{n-1})_n$ and $(x_{n-1}, y_{n-1}, \theta_{n-1})_1$ specify the preceding-vehicle ("n−1"-th vehicle) position according to the "n"-th-vehicle coordinate system and the first vehicle coordinate system, by comparing these values, the difference $(\Delta x, \Delta y, \Delta\theta)_{n\to 1}$ between the leading vehicle coordinate system and the succeeding vehicle coordinate system can be directly computed. Therefore, when calculating the difference, it is not necessary to add all the differences between pairs of sequential vehicles $(\Delta x, \Delta y, \Delta\theta)_{2\to 1}$, $(\Delta x, \Delta y, \Delta\theta)_{3\to 2}$, $(\Delta x, \Delta y, \Delta\theta)_{4\to 3}$, ... $(\Delta x, \Delta y, \Delta\theta)_{n-1\to n-2}$, thereby reducing the calculation load.

Further, the information to be transmitted from the preceding vehicle ("n−1"-th vehicle) to the succeeding vehicle ("n"-th vehicle) by vehicle-to-vehicle communication is only the $(x_{n-1}, y_{n-1}, \theta_{n-1})_1$ in the second track data T2 of the preceding vehicle ("n−1"-th vehicle). Therefore, it is not necessary to obtain the differences between pairs of sequential vehicles $(\Delta x, \Delta y, \Delta\theta)_{2\to 1}$, $(\Delta x, \Delta y, \Delta\theta)_{3\to 2}$, $(\Delta x, \Delta y, \Delta\theta)_{4\to 3}$, ... $(\Delta x, \Delta y, \Delta\theta)_{n-1\to n-2}$, thereby reducing the load on the vehicle-to-vehicle communication and on the CPUs, and enabling quick control.

In addition, the preceding-vehicle ("n−1"-th vehicle) position in the leading vehicle (first vehicle) coordinate system, which is used to calculate the difference $(\Delta x, \Delta y, \Delta\theta)_{n\to 1}$ in block B104, is produced, based on the difference $(\Delta x, \Delta y, \Delta\theta)_{n-1\to 1}$ which was calculated by the preceding vehicle ("n−1"-th vehicle) in block B105.

When the process in block B104 is represented by function "f", the calculation is expressed by:

$$(\Delta x, \Delta y, \Delta\theta)_{n\to 1} = f\{(x_{n-1}, y_{n-1}, \theta_{n-1})_1\}. \quad (2\text{-}1)$$

When the process in block B105 is represented by function "g", the following calculation is preformed in block B105 in the preceding vehicle ("n−1"-th vehicle):

$$(x_{n-1}, y_{n-1}, \theta_{n-1})_1 = g\{(\Delta x, \Delta y, \Delta\theta)_{n-1\to 1}\}. \quad (2\text{-}2)$$

From the formulas (2-1) and (2-2), the following formula is derived:

$$(\Delta x, \Delta y, \Delta\theta)_{n\to 1} = g \cdot f\{(\Delta x, \Delta y, \Delta\theta)_{n-1\to 1}\}. \quad (2\text{-}3)$$

According to the formula (2-3), the difference $(\Delta x, \Delta y, \Delta\theta)_{n\to 1}$ between the succeeding vehicle ("n"-th-vehicle) coordinate system and the leading vehicle (first vehicle) coordinate system is produced, based on the difference $(\Delta x, \Delta y, \Delta\theta)_{n-1\to 1}$ between the preceding-vehicle ("n−1"-th-vehicle) coordinate system and the leading vehicle (first vehicle) coordinate system. Accordingly, because the formula (2-3) is calculated successively by the vehicles in front, the difference $(\Delta x, \Delta y, \Delta\theta)_{n\to 1}$ is based on the differences $(\Delta x, \Delta y, \Delta\theta)_{2\to 1}$, $(\Delta x, \Delta y, \Delta\theta)_{3\to 1}$, $(\Delta x, \Delta y, \Delta\theta)_{4\to 1}$, ... $(\Delta x, \Delta y, \Delta\theta)_{n-1\to 1}$ which were used in the conversion of the respective vehicle positions to the leading vehicle coordinate system by the preceding vehicle and the vehicles in front of the preceding vehicle. According to the automatic following travel system 10, the differences which the respective vehicles use to convert their positions into the coordinates in the leading vehicle coordinate system are not asynchronous, and the transformations by the respective vehicles are therefore accurate.

This invention may be embodied in other forms or carried out in other ways without departing from the spirit thereof.

The present embodiments are therefore to be considered in all respects illustrative and not limiting, the scope of the invention being indicated by the appended claims, and all modifications falling within the meaning and range of equivalency are intended to be embraced therein.

What is claimed is:

1. An automatic following travel system that allows processional travel with a leading vehicle and a plurality of succeeding vehicles automatically following the leading vehicle, wherein each of the vehicles comprises:

a vehicle-to-vehicle communicator for communicating with the other vehicles; and a self position detector for detecting the position of the vehicle in which it is mounted, in a self coordinate system which is stored in the vehicle, and each of the succeeding vehicles comprises:

a preceding vehicle position detector for detecting the position of a preceding vehicle in front of the succeeding vehicle in the procession in a succeeding vehicle coordinate system;

a succeeding vehicle position transformer for transforming the succeeding vehicle position information from the succeeding vehicle coordinate system to a leading vehicle coordinate system, based on preceding vehicle position information in the succeeding vehicle coordinate system detected by the preceding vehicle position detector, on the succeeding vehicle position information in the succeeding vehicle coordinate system detected by the self position detector, and on information representing the relationship between the preceding vehicle coordinate system and the leading vehicle coordinate system transmitted from the preceding vehicle by the vehicle-to-vehicle communicator;

a vehicle controller for driving the succeeding vehicle to follow the leading vehicle, based on the transformation by the succeeding-vehicle-position-to-leading-vehicle-position-coordinate-system transformer and on the position of the leading vehicle.

2. An automatic following travel system according to claim 1, wherein the succeeding vehicle position transformer comprises:

a succeeding-vehicle-position-to-preceding-vehicle-coordinate-system transformer for transforming the succeeding vehicle position information from the succeeding vehicle coordinate system to the preceding vehicle coordinate system, based on preceding vehicle position information in the succeeding vehicle coordinate system detected by the preceding vehicle position detector, on the succeeding vehicle position information in the succeeding vehicle coordinate system detected by the self position detector, and on the preceding vehicle position information in the preceding coordinate system transmitted by the vehicle-to-vehicle communicator; and a succeeding-vehicle-position-to-leading-vehicle-coordinate-system transformer for transforming the succeeding vehicle position information, which was transformed to the preceding vehicle coordinate system, to the leading vehicle coordinate system, based on the transformation in the preceding vehicle to the leading vehicle coordinate system transmitted by the vehicle-to-vehicle communicator, when the preceding vehicle is not the leading vehicle.

3. An automatic following travel system according to claim 1, wherein the succeeding vehicle position transformer comprises:

a difference calculator for calculating differences in traveling direction and in a x- and y-directions between the succeeding vehicle coordinate system and the preceding vehicle coordinate system; and a first transformer for transforming the succeeding vehicle position information from the succeeding coordinate system to the preceding vehicle coordinate system, based on the differences between the succeeding vehicle coordinate system and the preceding vehicle coordinate system calculated by the difference calculator of the succeeding vehicle; and a second transformer for transforming the succeeding vehicle position information from the preceding vehicle coordinate system to the leading vehicle coordinate system, based on the differences between the preceding vehicle coordinate system and the leading vehicle coordinate system which are calculated by the difference calculator of the preceding vehicle and are transmitted to the succeeding vehicle by the vehicle-to-vehicle communicator.

4. An automatic following travel system according to claim 3, wherein the difference calculator employs a certain percentage of the calculation results as the differences in traveling direction.

5. An automatic following travel system according to claim 3, wherein the difference calculator employs a certain percentage of the calculation results as the differences in the x- and y-directions.

6. An automatic following travel system according to claim 1, wherein the succeeding vehicle position transformer comprises:

a succeeding-vehicle-position-to-leading-vehicle-coordinate-system transformer for transforming the succeeding vehicle position information from the succeeding vehicle coordinate system to the leading vehicle coordinate system, based on preceding vehicle position information, which was transformed to the leading vehicle coordinate system by the preceding vehicle and was transmitted by the vehicle-to-vehicle communicator, on preceding vehicle position information in the succeeding vehicle coordinate system detected by the preceding vehicle position detector, and on the succeeding vehicle position information in the succeeding vehicle coordinate system detected by the self position detector.

7. An automatic following travel system according to claim 1, wherein the succeeding vehicle position transformer comprises:

a difference calculator for calculating differences in traveling direction and in a x- and y-directions between the succeeding vehicle coordinate system and the preceding vehicle coordinate system which was transformed to the leading vehicle coordinate system by the preceding vehicle; and a transformer for transforming the succeeding vehicle position information from the succeeding coordinate system to the leading vehicle coordinate system, based on the differences between the succeeding vehicle coordinate system and the preceding vehicle coordinate system calculated by the succeeding vehicle.

8. An automatic following travel system according to claim 7, wherein the difference calculator employs a certain percentage of the calculation results as the differences in traveling direction.

9. An automatic following travel system according to claim 7, wherein the difference calculator employs a certain percentage of the calculation results as the differences in the x- and y-directions.

10. An automatic following travel system according to claim 1, wherein, each of the vehicle sets the point of a magnetic nail, buried in the ground, as the origin of its coordinate system before starting.

11. An automatic following travel system according to claim 1, wherein as the communication by the vehicle-to-vehicle communicator is opened, timers in the respective electric vehicles are reset and synchronized.

* * * * *

UNITED STATES PATENT AND TRADEMARK OFFICE
CERTIFICATE OF CORRECTION

PATENT NO. : 6,301,530 B1
DATED : October 9, 2001
INVENTOR(S) : Kazuya Tamura

It is certified that error appears in the above-identified patent and that said Letters Patent is hereby corrected as shown below:

Title page,
Please correct the assignee information as follows:
-- [73] Assignee Honda Giken Kogyo Kabushiki Kaisha, Tokyo (JP) --

Signed and Sealed this

Seventh Day of May, 2002

Attest:

JAMES E. ROGAN
*Attesting Officer*     *Director of the United States Patent and Trademark Office*